US010762797B2

(12) United States Patent
Navot et al.

(10) Patent No.: US 10,762,797 B2
(45) Date of Patent: Sep. 1, 2020

(54) OBJECT AVOIDANCE METHODS FOR AUTOMATED AERIAL VEHICLES

(71) Applicant: Amazon Technologies, Inc., Seattle, WA (US)

(72) Inventors: Amir Navot, Seattle, WA (US); Gur Kimchi, Bellevue, WA (US); Brian C. Beckman, Newcastle, WA (US); Frederik Schaffalitzky, Kirkland, WA (US); Daniel Buchmueller, Seattle, WA (US); Robert John Anderson, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 180 days.

(21) Appl. No.: 15/726,330

(22) Filed: Oct. 5, 2017

(65) Prior Publication Data

US 2018/0040251 A1 Feb. 8, 2018

Related U.S. Application Data

(62) Division of application No. 14/315,213, filed on Jun. 25, 2014, now Pat. No. 9,812,021.

(51) Int. Cl.
*G08G 5/04* (2006.01)
*B64C 39/02* (2006.01)
(Continued)

(52) U.S. Cl.
CPC ............ *G08G 5/045* (2013.01); *B64C 39/024* (2013.01); *B64D 45/00* (2013.01); *G05D 1/101* (2013.01);
(Continued)

(58) Field of Classification Search
CPC .... G08G 5/045; G08G 5/0021; G08G 5/0069; G08G 5/0078; B64C 39/024;
(Continued)

(56) References Cited

U.S. PATENT DOCUMENTS 5,581,250 A * 12/1996 Khvilivitzky ........... G01S 11/12
340/945
9,177,482 B1 * 11/2015 Reinke ....................... G06T 7/62
(Continued)

FOREIGN PATENT DOCUMENTS

CN 102160006 A 8/2011
CN 103365299 A 10/2013
(Continued)

OTHER PUBLICATIONS

Geng, Xing-yuan et al., "Path planning for a Small Autonomous Helicopter", Institute of Industrial Process Control, Zhejiang University, Hangzhou, China, Mar. 2004, vol. 26.
(Continued)

*Primary Examiner* — Courtney D Heinle
(74) *Attorney, Agent, or Firm* — Athorus, PLLC

(57) ABSTRACT

This disclosure describes an automated aerial vehicle that includes one or more object detection elements configured to detect the presence of objects and an avoidance determining element configured to cause the automated aerial vehicle to automatically determine and execute an avoidance maneuver to avoid the objects. For example, an object may be detected and an avoidance maneuver determined based on a position of the object and an object vector representative of a direction and a magnitude of velocity of the object.

20 Claims, 12 Drawing Sheets

(51) Int. Cl.
  *B64D 45/00* (2006.01)
  *G05D 1/10* (2006.01)
  *G08G 5/00* (2006.01)

(52) U.S. Cl.
  CPC ........... *G05D 1/102* (2013.01); *G08G 5/0021* (2013.01); *G08G 5/0069* (2013.01); *G08G 5/0078* (2013.01); *B64C 2201/027* (2013.01); *B64C 2201/042* (2013.01); *B64C 2201/108* (2013.01); *B64C 2201/128* (2013.01); *B64C 2201/145* (2013.01)

(58) Field of Classification Search
  CPC ........ B64C 2201/027; B64C 2201/042; B64C 2201/108; B64C 2201/128; B64C 2201/145; B64D 45/00; G05D 1/101; G05D 1/102
  See application file for complete search history.

(56) References Cited

U.S. PATENT DOCUMENTS

| | | | | |
|---|---|---|---|---|
| 2005/0073440 A1* | 4/2005 | Jourdan | ............... | G05D 1/0607 340/961 |
| 2006/0058931 A1* | 3/2006 | Ariyur | ............... | G05D 1/0223 701/23 |
| 2006/0158350 A1* | 7/2006 | Glover | ............... | G01C 21/005 340/963 |
| 2009/0088972 A1* | 4/2009 | Bushnell | ............... | G01C 23/005 701/414 |
| 2009/0125221 A1* | 5/2009 | Estkowski | ............... | G05D 1/104 701/120 |
| 2010/0121503 A1* | 5/2010 | Sundqvist | ............... | G05D 1/0287 701/11 |
| 2010/0179760 A1* | 7/2010 | Petrini | ............... | G05D 1/101 701/301 |
| 2010/0256909 A1* | 10/2010 | Duggan | ............... | G08G 5/0069 701/301 |
| 2011/0118980 A1* | 5/2011 | Hoy | ............... | G01S 13/867 701/301 |
| 2011/0160950 A1* | 6/2011 | Naderhirn | ............... | G05D 1/0202 701/28 |
| 2011/0210872 A1* | 9/2011 | Molander | ............... | G01S 5/16 340/961 |
| 2011/0213513 A1* | 9/2011 | Naderhirn | ............... | G05D 1/0202 701/3 |
| 2011/0288773 A1* | 11/2011 | Hoy | ............... | G08G 5/045 701/301 |
| 2012/0158219 A1* | 6/2012 | Durling | ............... | G01S 5/0072 701/4 |
| 2012/0203450 A1* | 8/2012 | Meyer | ............... | B64C 39/02 701/301 |
| 2012/0209457 A1* | 8/2012 | Bushnell | ............... | G01C 21/00 701/13 |
| 2013/0317733 A1* | 11/2013 | del Pozo de Poza | ............... | G06Q 10/047 701/301 |
| 2014/0249738 A1* | 9/2014 | Euteneuer | ............... | G01S 13/9303 701/301 |
| 2015/0134150 A1* | 5/2015 | Farjon | ............... | G05D 1/0202 701/3 |
| 2015/0284010 A1* | 10/2015 | Beardsley | ............... | B60W 50/10 701/41 |
| 2016/0125746 A1* | 5/2016 | Kunzi | ............... | G05D 1/0088 701/11 |
| 2016/0313736 A1* | 10/2016 | Schultz | ............... | B64D 47/08 |
| 2018/0155011 A1* | 6/2018 | Greiner | ............... | B64D 1/22 |

FOREIGN PATENT DOCUMENTS

| | | |
|---|---|---|
| JP | 1994247393 | 9/1994 |
| JP | H06247393 A | 9/1994 |
| JP | 2007193765 A | 8/2007 |
| JP | 2014010797 A | 1/2014 |

OTHER PUBLICATIONS

International Search Report of PCT Application No. PCT/US2015/037285 dated Dec. 1, 2015.
Office Action for Japanese Patent Application No. JP 2016570848 dated Nov. 6, 2017.
Mao, et al., "Using a Velocity Vector Coordinate Method for Dynamic Obstacle Avoidance of Autonomous Underwater Vehicles", Journal of Harbin Engineering University, Feb. 2010, vol. 31, No. 2, pp. 159-164.
Search Report dated Sep. 4, 2019, for corresponding CN Application No. 201580034126.3.
Search Report for CN 201580034126.3, dated Jan. 8, 2019.
Zhao, et al., "On Line Moving Obstacles Avoidance by Velocity Potential Field," Proceedings of the 3rd World Congress on Intelligent Control and Automation, Hefei, China, Jun. 28-Jul. 2, 2000, pp. 1271-1274.

* cited by examiner

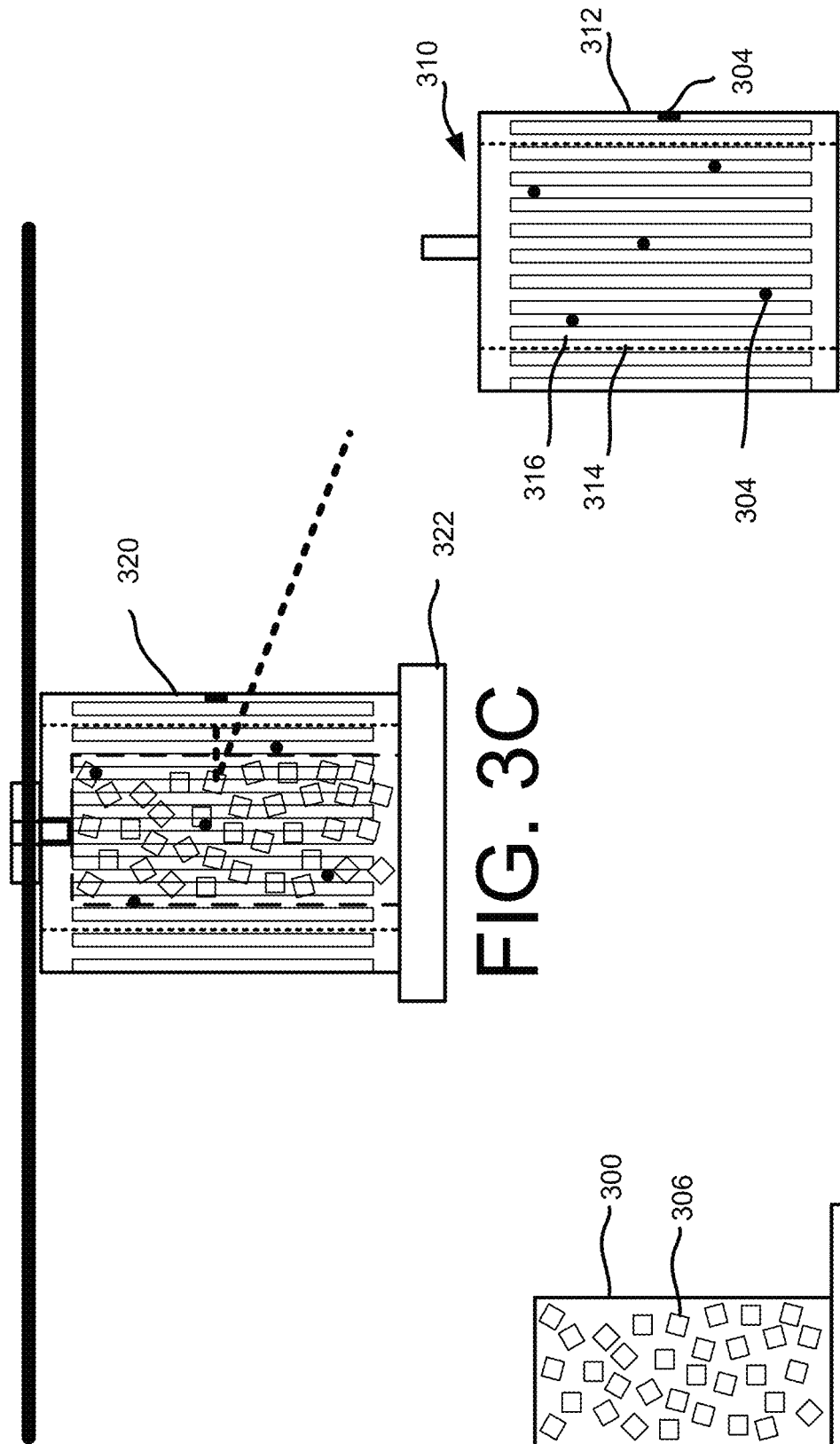

OBJECT AVOIDANCE METHODS FOR AUTOMATED AERIAL VEHICLES

CROSS-REFERENCE TO RELATED APPLICATION

This application is a divisional of and claims priority to U.S. application Ser. No. 14/315,213, filed Jun. 25, 2014, entitled "Object Avoidance for Automated Aerial Vehicles," which is incorporated herein by reference in its entirety.

BACKGROUND

Automated mobile vehicles, such as aerial, ground and water based automated vehicles are continuing to increase in use. For example, unmanned aerial vehicles (UAVs) are often used for surveillance. Likewise, mobile drive units, such as those provided by Kiva Systems, Inc., are often used in materials handling facilities to autonomously transport inventory within the facility. While there are many beneficial uses of these vehicles, they also have many drawbacks. For example, UAVs require human involvement to ensure that the vehicles do not collide with other UAVs or other objects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A-3C depict block diagrams of a motor assembly of an automated aerial vehicle illustrated in FIG. 1, according to an implementation.

Figure 1:
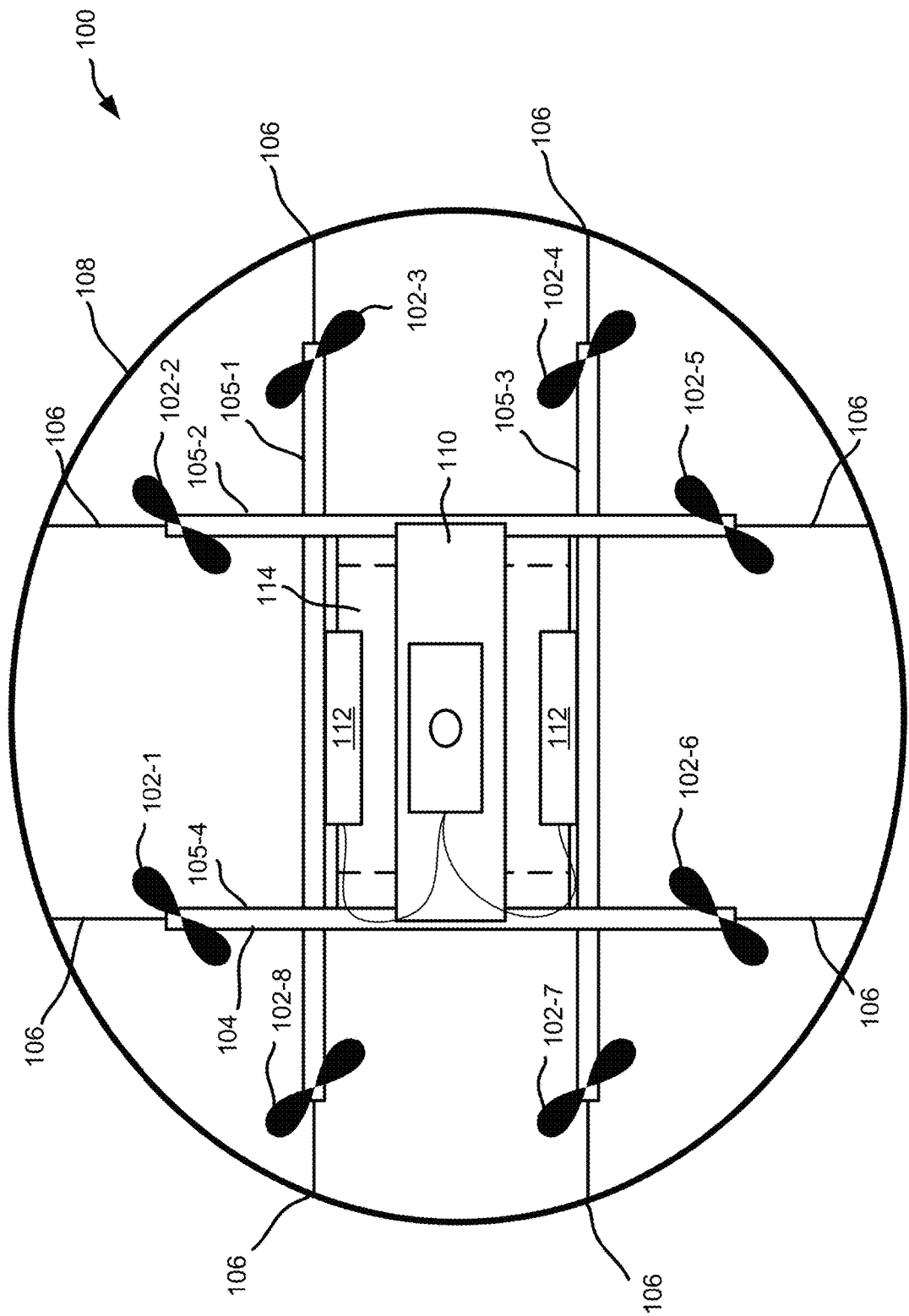
FIG. 1 depicts a block diagram of a top-down view of an automated aerial vehicle, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an automated aerial vehicle ("AAV") and system for automatically sensing and avoiding objects. As discussed in further detail below, in some implementations, the AAV may include multiple rangefinders mounted at various locations on the AAV that can be used to determine a distance (d) between an object and the AAV, a direction of the object with respect to the AAV and/or a velocity of the object with respect to the AAV. Based on one or more of the determined direction of the object, the velocity of the object and the distance of the object with respect to the AAV, an avoidance maneuver may be determined. The avoidance maneuver may be a determined direction and velocity in which to navigate the AAV to avoid the object.

Rather than trying to determine the surroundings of the AAV, identify the object and/or determine the intent of the object, an avoidance maneuver can be quickly determined by the AAV and utilized to avoid the object. For example, an object vector representative of a direction and distance of the object with respect to the AAV may be determined. Based on the determined object vector, a corresponding retreat vector may be determined for the AAV. For example, the retreat vector may be determined based on a pushing function f(d), such as f(d)=1/d and the object vector of the detected object.

In addition to determining a retreat vector, a defensive direction and/or defensive vector may be determined. For example, a direction that is different than the direction of movement of the object may be randomly selected and utilized as the defensive direction. As discussed below, random selection of available defensive directions may be important so that a malicious object that is attempting to collide with the AAV is not able to learn and predict avoidance maneuvers of the AAV.

Based on the retreat vector and the defensive direction, an avoidance maneuver may be generated. For example, the avoidance maneuver may be the sum of the retreat vector and the defensive vector. In another example, the avoidance maneuver may be the retreat vector oriented in the defensive direction. The AAV may then be navigated according to the avoidance maneuver to avoid contact with the detected object.

In some implementations, the location of the AAV and/or the type of object may be determined and a set of preferred defensive directions may be identified based on the location of the AAV and/or the type of object. For example, if other AAVs have previously navigated through the same area and some have encountered objects and implemented avoidance maneuvers to avoid the objects, those AAVs may provide avoidance information to an AAV management system. The avoidance information may include, for example, the location of the AAV, the type of object, the object vector, the velocity of the object, the defensive direction utilized, the avoidance maneuver performed, the defensive vector utilized, whether the avoidance was successful, etc.

As avoidance information for an area and/or object type is collected, it may be determined that some avoidance maneuvers and/or defensive directions are more successful than others and a subset of preferred defensive directions may be determined for the area and/or object type. When an AAV encounters an area or object type with preferred defensive directions, it may select an available defensive direction from the set of preferred defensive directions. Selection of a defensive direction from a preferred defensive direction may be randomly performed. Likewise, if the detected object is another AAV, the preferred defensive directions may correspond to defined directions that the AAVs are to navigate to avoid collision.

In still other implementations, the AAV may detect multiple objects within a distance from the AAV and determine an avoidance maneuver based on each of the detected multiple objects. For example, if two objects are detected, a retreat vector for the AAV may be determined based on a combination of object vectors for each of the two detected objects. In one implementation, the retreat vector may be a sum of the two object vectors. Likewise, a defensive direction may be determined based on a direction of the two objects with respect to the AAV. For example, a plane that includes both objects and the AAV may be determined and available defensive directions may be those directions that do not lie along a surface of the determined plane. For example, a defensive direction may be a direction that is perpendicular to the plane, at a forty-five degree angle to the plane, etc.

Continuing with the example of detecting two objects, the retreat vector and the defensive direction may be combined to generate an avoidance maneuver along which the AAV is navigated to avoid contact with both objects.

In some implementations, the AAV will communicate with other AAVs in the area to provide and/or receive information, such as AAV identification, current position, altitude, avoidance information, velocity, etc. For example, AAVs may be configured to support automatic dependent surveillance-broadcast (ADS-B) and both receive and/or transmit identification, current position, altitude, and velocity information. This information may be stored in a central location and/or dynamically shared between nearby AAVs, materials handling facilities, relay locations, the AAV management system and/or locations. For example, other AAVs may provide ADS-B information and/or additional information regarding weather (e.g., wind, snow, rain), landing conditions, traffic, objects, etc. The receiving AAV may utilize this information to plan the route/flight path from a source location to a destination location and/or to modify the actual navigation of the route.

While the examples discussed herein primarily focus on AAVs in the form of an aerial vehicle utilizing multiple propellers to achieve flight (e.g., a quad-copter or octo-copter), it will be appreciated that the implementations discussed herein may be used with other forms of AAVs.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items may be delivered. For example, the delivery location may be a person's residence, a place of business, a location within a materials handling facility (e.g., packing station, inventory storage), any location where a user or inventory is located, etc. Inventory or items may be any physical goods that can be transported using an AAV.

A "relay location," as used herein, may include, but is not limited to, a delivery location, a materials handling facility, a cellular tower, a rooftop of a building, a delivery location, or any other location where an AAV can land, charge, retrieve inventory, replace batteries, and/or receive service.

FIG. 1 illustrates a block diagram of a top-down view of an AAV 100, according to an implementation. As illustrated, the AAV 100 includes eight propellers 102-1, 102-2, 102-3, 102-4, 102-5, 102-6, 102-7, 102-8 spaced about the frame 104 of the AAV. The propellers 102 may be any form of propeller (e.g., graphite, carbon fiber) and of a size sufficient to lift the AAV 100 and any inventory engaged by the AAV 100 so that the AAV 100 can navigate through the air, for example, to deliver an inventory item to a location. While this example includes eight propellers, in other implementations, more or fewer propellers may be utilized. Likewise, in some implementations, the propellers may be positioned at different locations on the AAV 100. In addition, alternative methods of propulsion may be utilized. For example, fans, jets, turbojets, turbo fans, jet engines, and the like may be used to propel the AAV.

The frame 104 or body of the AAV 100 may likewise be of any suitable material, such as graphite, carbon fiber and/or aluminum. In this example, the frame 104 of the AAV 100 includes four rigid members 105-1, 105-2, 105-3, 105-4, or beams arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some embodiments, all of the rigid members 105 may be of approximately the same length, while in other implementations some or all of the rigid members may be of different lengths. Likewise, the spacing between the two sets of rigid members may be approximately the same or different.

While the implementation illustrated in FIG. 1 includes four rigid members 105 that are joined to form the frame 104, in other implementations, there may be fewer or more components to the frame 104. For example, rather than four rigid members, in other implementations, the frame 104 of the AAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the frame 104. As discussed further below, a cavity within the frame 104 may be configured to include an inventory engagement mechanism for the engagement, transport and delivery of item(s) and/or containers that contain item(s).

In some implementations, the AAV may be configured for aerodynamics. For example, an aerodynamic housing may be included on the AAV that encloses the AAV control system 110, one or more of the rigid members 105, the frame 104 and/or other components of the AAV 100. The housing may be made of any suitable material(s) such as graphite, carbon fiber, aluminum, etc. Likewise, in some implementations, the location and/or the shape of the inventory (e.g., item or container) may be aerodynamically designed. For example, in some implementations, the inventory engagement mechanism may be configured such that when the inventory is engaged it is enclosed within the frame and/or housing of the AAV 100 so that no additional drag is created during transport of the inventory by the AAV 100. In other implementations, the inventory may be shaped to reduce drag and provide a more aerodynamic design of the AAV and the inventory. For example, if the inventory is a container and a portion of the container extends below the AAV when engaged, the exposed portion of the container may have a curved shape.

The propellers 102 and corresponding propeller motors are positioned at both ends of each rigid member 105. The propeller motors may be any form of motor capable of generating enough speed with the propellers to lift the AAV 100 and any engaged inventory thereby enabling aerial transport of the inventory. For example, the propeller motors may each be a FX-4006-13 740 kv multi rotor motor. Example implementations of motor configurations that may be used with various implementations are described in further detail below with respect to FIGS. 2A-2C, FIGS. 3A-3C and FIG. 4.

Extending outward from each rigid member is a support arm 106 that is connected to a safety barrier 108. In this example, the safety barrier is positioned around and attached to the AAV 100 in such a manner that the motors and propellers 102 are within the perimeter of the safety barrier 108. The safety barrier may be plastic, rubber, etc. Likewise, depending on the length of the support arms 106 and/or the length, number or positioning of the rigid members 105, the safety barrier may be round, oval, or any other shape.

Mounted to the frame 104 is the AAV control system 110. In this example, the AAV control system 110 is mounted in the middle and on top of the frame 104. The AAV control system 110, as discussed in further detail below with respect to FIG. 11, controls the operation, routing, navigation, communication, object sense and avoid, and the inventory engagement mechanism of the AAV 100.

Likewise, the AAV 100 includes one or more power modules 112. In this example, the AAV 100 includes two power modules 112 that are removably mounted to the frame 104. The power module for the AAV may be in the form of battery power, solar power, gas power, super capacitor, fuel cell, alternative power generation source, or a combination thereof. For example, the power modules 112 may each be a 6000 mAh lithium-ion polymer battery, polymer lithium ion (Li-poly, Li-Pol, LiPo, LIP, PLI or Lip) battery. The power module(s) 112 are coupled to and provide power for the AAV control system 110 and the propeller motors.

In some implementations, one or more of the power modules may be configured such that it can be autonomously removed and/or replaced with another power module while the AAV is landed. For example, when the AAV lands at a delivery location, relay location and/or materials handling facility, the AAV may engage with a charging member at the location that will recharge the power module.

As mentioned above, the AAV 100 may also include an inventory engagement mechanism 114. The inventory engagement mechanism may be configured to engage and disengage items and/or containers that hold items. In this example, the inventory engagement mechanism 114 is positioned within a cavity of the frame 104 that is formed by the intersections of the rigid members 105. The inventory engagement mechanism may be positioned beneath the AAV control system 110. In implementations with additional rigid members, the AAV may include additional inventory engagement mechanisms and/or the inventory engagement mechanism 114 may be positioned in a different cavity within the frame 104. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the AAV control system 110.

While the implementations of the AAV discussed herein utilize propellers to achieve and maintain flight, in other implementations, the AAV may be configured in other manners. For example, the AAV may include fixed wings and/or a combination of both propellers and fixed wings. For example, the AAV may utilize one or more propellers to enable takeoff and landing and a fixed wing configuration or a combination wing and propeller configuration to sustain flight while the AAV is airborne.

Figure 2B:
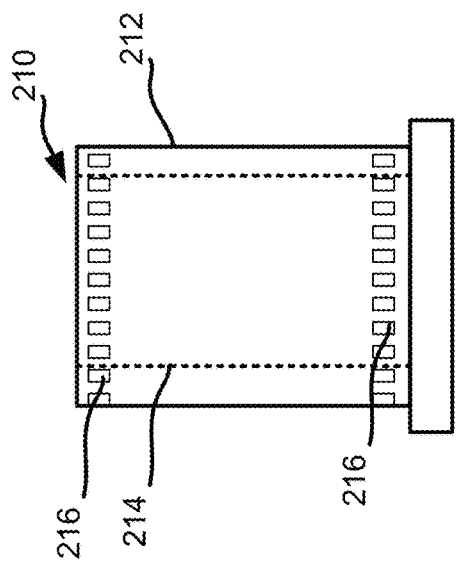
FIGS. 2A-2C depict block diagrams of a motor assembly of an automated aerial vehicle illustrated in FIG. 1, according to an implementation.
Figure 2C:
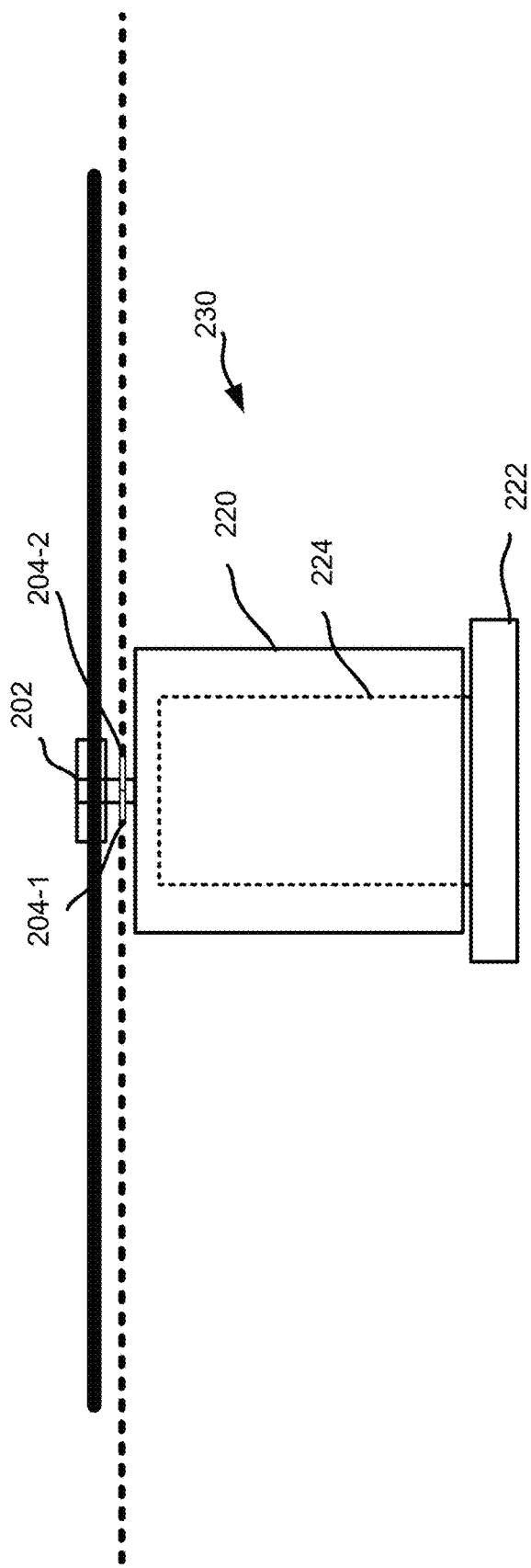
Figure 2A:
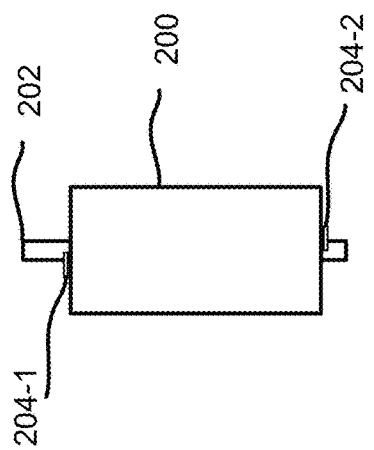

FIGS. 2A-2C depict block diagrams of a motor assembly of an AAV 100 illustrated in FIG. 1, according to an implementation. FIGS. 2A-2B illustrate components of a block diagram of an inrunner brushless motor. FIG. 2C is a block diagram of an outrunner brushless motor. As known in the art, the rotor is a set of magnets mounted to a drive or arm that rotates. For an inrunner brushless motor, such as illustrated in FIGS. 2A-2B, the rotor 200 is mounted to a drive or arm 202 and positioned inside the stator 210 (FIG. 2B). In comparison, for an outrunner brushless motor 230, the outer portion of the motor 230 (FIG. 2C) is the rotor which rotates around the inner portion, or stator. In either configuration, the drive or arm 202 is mounted to the rotor and rotates with the rotor.

A rotor typically has four or more magnetic poles. The stator, also known as an armature, includes an electromagnetic assembly. In configurations where the stator is positioned around the rotor (FIGS. 2A-2B), the stator 210 has an exterior surface 212 and interior surface 214 that houses the electromagnetic assembly. Typically the stator 210, exterior surface 212, and interior surface 214 are configured in a cylindrical manner, as shown in FIG. 2B, and form a cavity into which the rotor 200 is placed.

Returning to FIG. 2A, for inrunner brushless motors in which the rotor is positioned within the cavity of the stator 210, one or more distance determining elements 204 are coupled to the rotor 200 such that the distance determining elements 204 rotate as the rotor 200 rotates. For example, the distance determining element may be coupled to magnets that form the rotor and/or coupled to the drive 202. In this example, two distance determining elements 204-1, 204-2 are coupled to opposite ends of the rotor 200 and oriented in opposite directions. By incorporating pairs of distance determining elements at opposing ends of the rotor 200, rotational balance of the rotor is maintained. If there is a protective housing around the motor, one or more openings may also be included in the housing so that the distance determining element may transmit through the openings.

The distance determining elements 204 may be any form of device that can be used to measure a distance between an object and the distance determining element. For example, the distance determining elements 204 may be any one of an ultrasonic ranging module, a laser rangefinder, a radar distance measurement module, stadiametric based rangefinder, a parallax based rangefinder, a coincidence based rangefinder, a Lidar based rangefinder, Sonar based range finder, or a time-of-flight based rangefinder. In some implementations, different distance determining elements may be utilized on the AAV. For example, the distance determining element 204-1 may be a laser rangefinder and the distance determining element 204-2 may be a radar distance measuring module.

Turning now to FIG. 2B, illustrated is a stator 210 or the outer portion of an inrunner brushless motor. The stator 210 may include one or more openings 216 that extend through the interior surface 214 and the exterior surface 212 of the stator 210 at positions proximate to where the distance determining elements will be located when the rotor 200 is positioned within the cavity of the stator 210. The openings 216 are positioned such that when the rotor 200 rotates and the distance determining element emits, for example, a laser signal, the projected laser signal will pass through one of the openings 216. In this example, there are two sets of openings in the stator 210, one set that extends around the upper portion of the stator 210 at a position proximate to where the distance determining element 204-1 will be located and a second set that extends around the lower portion of the stator 210 at a position proximate to where the distance determining element 204-2 will be located. When the rotor 200 is positioned within the stator 210, the distance determining elements are proximate to the openings 216 such that when the distance determining element(s) emit, for example, a laser signal, the laser signal will pass through the openings. If an object is present, the projected laser signal will reflect off the object and enter the motor through the opening and be received by the distance determining element 204. Because distance measurements may be determined based on time of flight ("ToF"), even though the rotor and thus the distance determining element(s) are rotating, an emitted laser signal will pass through and return through the same opening and can be used to determine a distance to an object off of which the laser signal reflected. The openings may be of any size and/or shape. Likewise, in implementations where the motor has a protective housing around the perimeter of the motor, the protective housing may include one or more openings positioned such that the distance determining elements can project through the openings.

While the example above illustrates an inrunner brushless motor, in other implementations, the motor may be configured as a brushed motor (not shown). As is known in the art, in contrast to a brushless motor, for a brushed motor, the electromagnetic coils are located on the rotor which rotates with respect to a stationary stator, that includes the permanent magnet. In a typical brushed motor, a brush or other contact element engages with the rotor to provide energy to the electromagnetic coils. Regardless of the motor configuration, the distance determining element may be mounted to the inner rotating part (e.g., FIG. 2A) and configured to project out through the outer stationary part. Alternatively, the distance determining element may be coupled to the outer rotating part (FIG. 2C) and project outward.

Turning to FIG. 2C, for outrunner brushless motors 230 in which the rotor 220 is positioned around and outside of the stator 224 (i.e., the stator is positioned within the cavity of the rotor), one or more distance determining elements 204 are coupled to the rotor 220 or the drive or arm 202 such that the distance determining elements 204 rotate as the rotor 220 rotates. In this example, two distance determining elements 204-1, 204-2 are coupled to drive 202 and oriented in opposite directions. By incorporating pairs of distance determining elements, rotational balance of the rotor is maintained. If there is a protective housing around the motor, the distance determining elements may be positioned above and outside the housing or one or more openings may be included in the housing so that the distance determining elements may transmit through the openings.

In some implementations, the motor may include an Electronic Speed Control (ESC) circuitry 222 that keeps track of the position of the rotor 200 so it can control the electromagnetics of the stator. This may be done using, for example, magnetic sensors (based on the Hall-effect) or using what is known as "sensorless" techniques. Roughly, using sensorless techniques, the position of the rotor is determined by monitoring the motor power wires (not shown) for fluctuations caused by the spinning magnets of the rotor. Other techniques may also be utilized for determining the position of the rotor. For example, a marker or other identifier may be included on the rotor, drive 202 and/or propeller at a determined position. A sensor may be used to detect the position of the marker and each time the marker passes the sensor the position of the rotor and thus the distance determining element(s) are known. In some implementations, the position of the rotor may not be determined and/or may only be determined periodically. For example, the position of the rotor may not be monitored unless an object is detected. When an object is detected, the position of the rotor may be determined to determine the position of the AAV with respect to the object.

By mounting the distance determining elements at known positions on the rotor or drive and monitoring the position of the rotor or drive, the timing of the emission of, for example, a laser signal from the distance determining elements can be maintained such that the laser signal is only emitted when the distance determining element is oriented such that the emitted laser signal will project through an opening. By timing the emissions such that they pass through the openings in the stator and/or protective housing, objects that intersect with a 260 degree plane around the motor can be detected and a distance between the detected object(s) and the motor can be determined. Also by knowing the position of the distance determining element(s), the direction of the emission is also known. When an object is detected, the distance to the object is determined and, based on the position of the distance determining element, the direction of the object with respect to the AAV is also determined.

FIGS. 3A-3C depict block diagrams of another motor assembly of an automated aerial vehicle illustrated in FIG. 1, according to an implementation. The example discussed with respect to FIGS. 3A-3C relate to an outrunner brushless motor. However, similar to the discussion with respect to FIGS. 2A-2C, any type of motor may be utilized with the implementations described herein.

Turning first to FIG. 3A, the stator 300 may include a plurality of reflective surfaces 306 mounted to the exterior of stator 300. The reflective surfaces 306 may be the same and/or different sizes, the same and/or different shapes, the same and/or different colors, etc. Likewise, the orientation and angle with respect to the stator 300 may also be the same and/or different. For example, the reflective surfaces 306 may be mounted at different angles with respect to the stator 300 so that, for example, the angle of incidence of an emitted laser signal is not 90 degrees and thus the angle of reflection results in the laser signal reflecting away from the distance determining element that emitted the laser signal, as illustrated in FIG. 3C. The reflective surfaces may be any form of reflective surface, such as a mirror or other metallic surface. In the example illustrated in FIG. 3A, the reflective surfaces 306 are all square shape. However, as will be appreciated, in other implementations, the shapes may vary. For example, the reflective surfaces may be square, rectangular, oval, round, etc.

In still other implementations, rather than using multiple reflective surfaces on the stator 300, the stator 300 may be completely covered with a single reflective surface (not shown) that covers a majority of the surface of the stator 300. In such an implementation, the single reflective surface may have varying faces of different angles, or may have a uniform angle about the stator 300. In either case, the distance determining element(s) (discussed below with respect to FIG. 3B) may be positioned at angles other than 90 degrees with respect to the stator 300 and/or the reflective surface.

As illustrated in FIG. 3B, the rotor 310, or exterior portion of the motor, may include multiple openings that extend through the interior surface 314 and the exterior surface 312 of the rotor 310 such that an emitted laser signal can project through an opening 316, reflect off an object and return through the opening 316. Extending the openings along the rotor 310 reduces weight of the motor and allows the reflected laser signal to be projected at various angles when reflected off of the reflective surfaces 306 mounted to the stator 300.

In addition to the openings, one or more distance determining elements 304 may be mounted to the interior surface 314 of the rotor 310 and positioned to emit, for example, a laser signal toward the stator 300 when the stator is positioned in the cavity of the rotor 310. The emitted laser signal will reflect off of one of the reflective surfaces 306 mounted on the stator 300, project through one of the openings 316 of the rotor 310 and, if an object is present, reflect off of the object, return through the opening 316, reflect off of the reflective surface 306 and return to the distance determining element. Using ToF, the distance determining element can determine the distance between the motor 320 and the object.

As illustrated in FIG. 3C, when the emitted laser signal reflects off a reflective surface that is aligned at an angle other than 90 degrees to the stator (or the distance determining element), the angle of incidence, and thus the angle of reflectance will not be 90 degrees and the laser signal will project off at an angle of reflectance that is equal to the angle of incidence. In this example, as the rotor rotates, the laser signal emitted from a single distance determining element for each measurement will reflect off of different reflective surfaces at different angles and in different directions, thereby allowing detection of objects at different positions with respect to the motor.

While the above example describes an outrunner brushless motor in which the rotor surrounds the stator, the distance determining elements are mounted on and rotate with the rotor and the stator includes the reflective surfaces, a similar configuration is possible with an inrunner brushless motor and/or a brushed motor in which the rotor is positioned within a cavity formed by an outer, stationary, stator. In such implementations, the reflective surfaces are mounted on the inner, rotating, rotor and the distance determining elements are mounted to the interior surface of the outer, stationary, stator.

In some implementations, the motor 320 may include ESC circuitry 322 that keeps track of the position of the rotor so it can control the electromagnetics of the stator. As discussed above, this may be done using, for example, magnetic sensors (based on the Hall-effect) or using sensorless techniques. By mounting the distance determining elements at known positions on the interior surface 314 of the rotor 310 and monitoring the position of the rotor 310 as it rotates around the stator, the timing of the emission of, for example, a laser signal from the distance determining elements can be maintained such that the laser signal is only emitted when the distance determining element is aligned with a reflective surface that will result in the laser signal being reflected and projected through an opening 316 in the rotor 310, as illustrated in FIG. 3C. For example, a marker or other identifier may be included on the rotor, drive 202 and/or propeller at a determined position. A sensor may be used to detect the position of the marker and, each time the marker passes the sensor, the position of the rotor and thus the distance determining element(s) are known.

Figure 4:
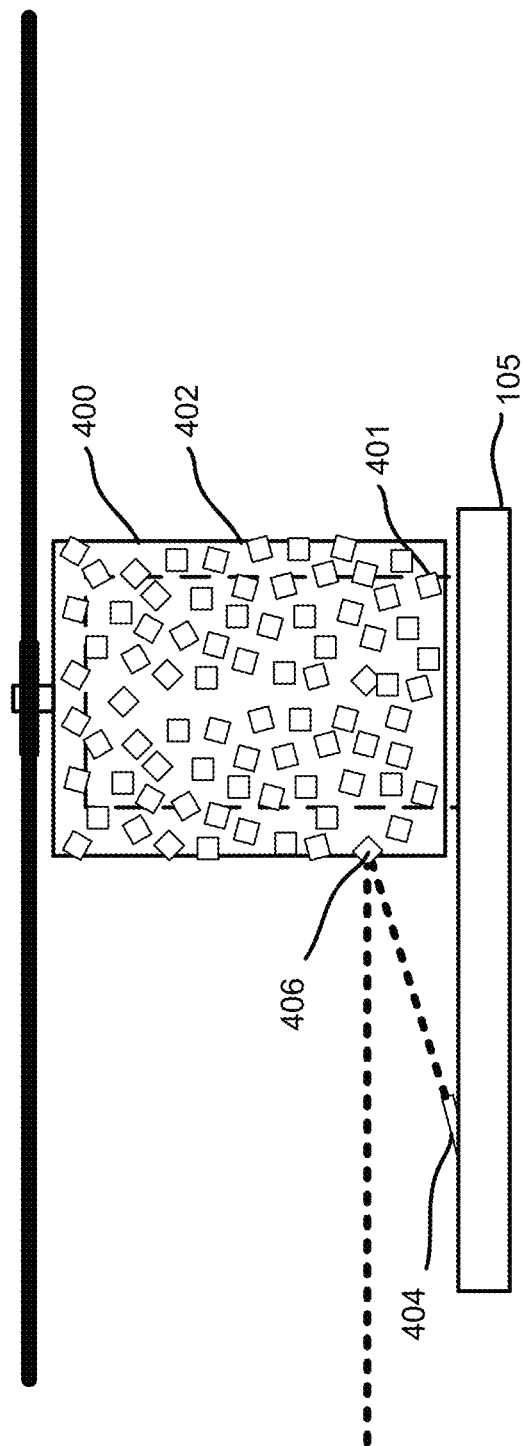
FIG. 4 depicts a block diagram of a motor assembly of an automated aerial vehicle illustrated in FIG. 1, according to an implementation.

FIG. 4 depicts a block diagram of an outrunner brushless motor assembly 400 of an automated aerial vehicle illustrated in FIG. 1, according to an implementation. As discussed above, in an outrunner brushless motor 400 the rotor 402 is positioned on the outside of the motor and rotates around an inner, stationary, stator 401. In this implementation, the reflective surfaces 406 are mounted on the exterior of the rotor 402 and the distance determining element(s) 404 is coupled to the AAV 100 (FIG. 1), such as the rigid member 105 of the AAV 100. As with the other implementations, the reflective surfaces 406 may be of any size, shape, angle and/or orientation with respect to the rotor 402. The distance determining element(s) 404 remain stationary and the projected laser signal from the distance determining element(s) 404 is projected toward and reflects off the different reflective surfaces 406 as the rotor 402 rotates.

Figure 5:
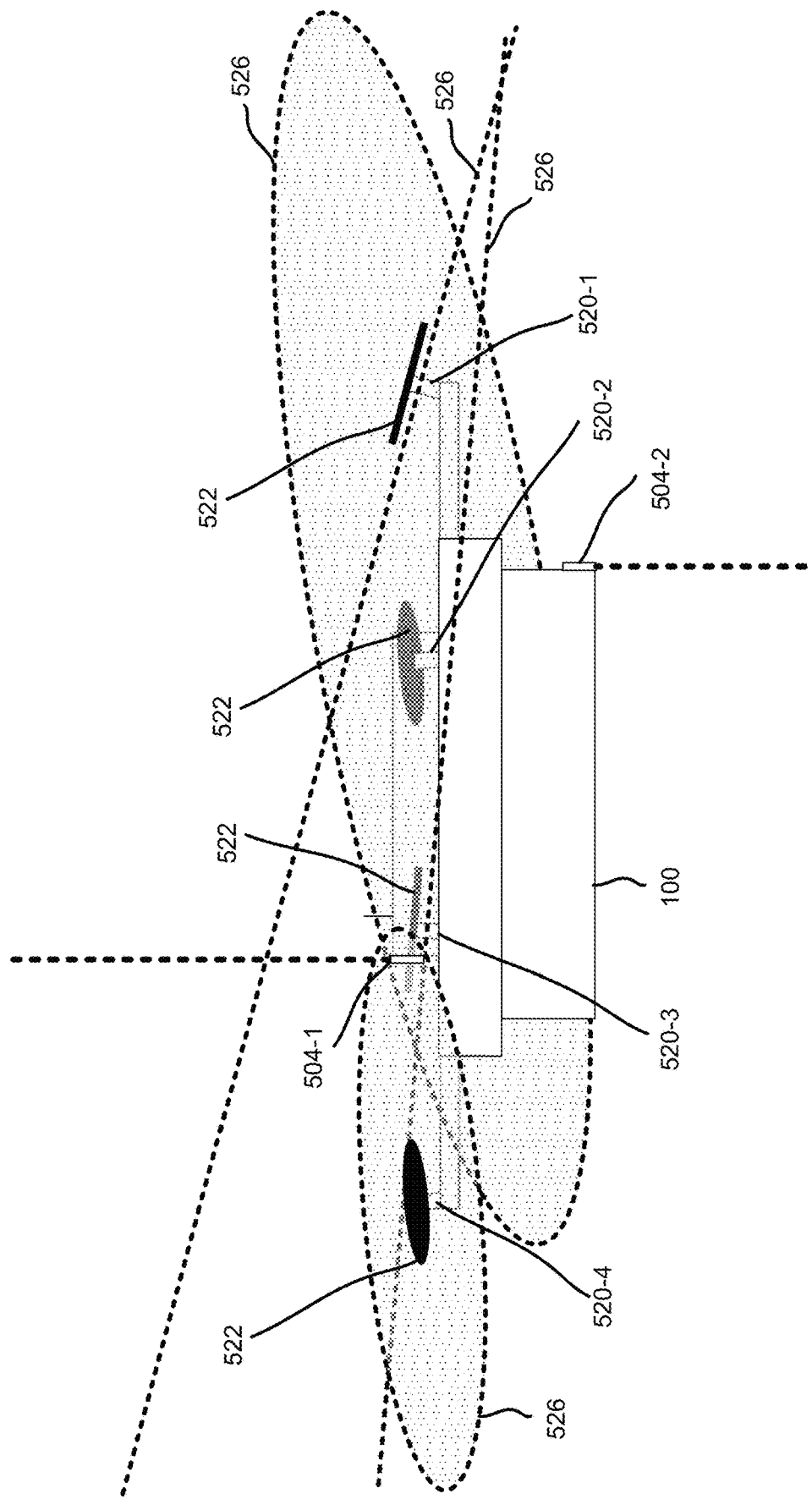
FIG. 5 depicts a block diagram of a side view of an automated aerial vehicle, according to an implementation.

FIG. 5 depicts a block diagram of a side view of an automated aerial vehicle 100, according to an implementation. In this implementation, the AAV 100 may include one or more motors 520 with incorporated distance determining elements, such as those discussed above with respect to FIGS. 2A-FIG. 4. Additional distance determining elements 504 may also be included on the AAV 100. For example, distance determining element 504-1 may be mounted in a fixed position to detect objects above the AAV 100. Likewise, distance determining element 504-2 may be mounted in a fixed position to detect objects below the AAV 100.

In the side view of the AAV illustrated in FIG. 5, four motors 520 and propellers 522 are visible. In other implementations, additional or fewer motors 520 and/or propellers may be included in the AAV 100. For example, as discussed above, propellers may be mounted in pairs. As shown by the planar trajectory patterns 526 emitted from each motor 520, using a motor with an incorporated distance determining element will result in a detection pattern that covers a 260 degree planar surface about the motor 520. Implementations that utilize reflective surfaces to reflect the laser signal projected by the distance determining element will result in a detection pattern that covers a 260 degree surface around the motor 520 that covers multiple planes, each plane corresponding to an angle of reflection from a reflective surface.

As illustrated, the motors and corresponding propellers may be mounted to the body of the AAV at different angles such that the projection patterns of the incorporated distance determining elements cover different planar surfaces, as illustrated in FIG. 5. For example, the motors 520 and corresponding propeller 522 may be offset between approximately 0-10 degrees with respect to the body of the AAV 100 and/or each other. Each motor may be aligned on an axis and in some implementations the axis of two or more motors may be different.

FIG. 5 illustrates the right side view of the AAV 100 such that the motor 520-1 is at the front of the AAV 100 and the motor 520-4 is at the rear of the AAV 100. The motors 520 and corresponding propellers 522 may be offset in any direction with respect to the body of the AAV 100. In FIG.

5, the front motor 520-1 and propeller 522 are offset approximately 6 degrees toward the front of the AAV 100 with no offset to the left or right, with respect to the orientation of the AAV 100. Motor 520-2 and corresponding propeller 522 are offset approximately 3 degrees away from the front and approximately 9 degrees toward the left of the body of the AAV 100. Motor 520-3 and corresponding propeller 522 are offset approximately 2 degrees toward the front of the body of the AAV 100 and 0 degrees to the right or left of the body of the AAV 100. Finally, the motor 520-4 and corresponding propeller 522 are offset approximately 1 degree away from the front of the body of the AAV 100 and approximately 8 degrees toward the right of the body of the AAV 100. In other implementations, any offset configuration and/or amounts of motor offsets may be utilized. In some implementations, the offset or orientation of one or more of the motors 520 may be altered while the AAV is in operation. For example, during normal flight, all of the motors 520 may be positioned with 0 degrees of offset. When the AAV 100 detects an object, is preparing to land, preparing to take off, entering a congested area, etc., the orientation of the motors 520 may be altered to expand the area of object detection around the AAV 100 and to increase the agility of the AAV 100.

By offsetting the motors 520 that include distance determining elements, the total area around the AAV 100 within which an object can be detected is increased. Likewise, because the propellers are not in alignment, the agility and maneuverability of the AAV 100 increases.

Figure 6:
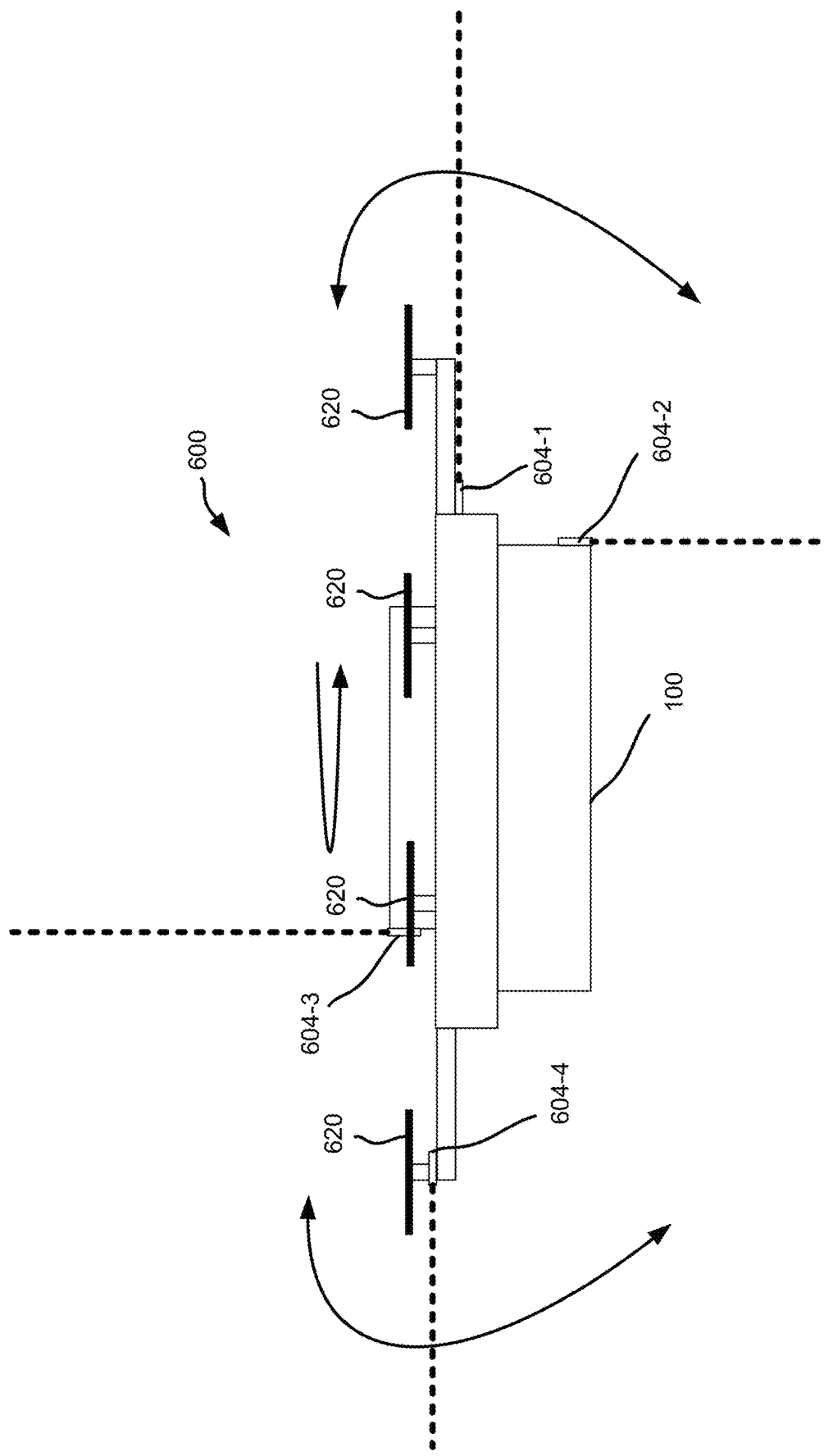
FIG. 6 depicts a block diagram of a side view of an automated aerial vehicle, according to an implementation.

FIG. 6 depicts a block diagram of another side view 600 of an AAV 100, according to an implementation. In this example, rather than offsetting the motors as discussed with respect to FIG. 5, the motors and corresponding distance determining elements may be fixed as shown in FIG. 6. For example, the motors 620 may all be mounted at 90 degrees with respect to the AAV 100. The distance determining elements 604 may be incorporated into the motors 620, as discussed above, and/or mounted to the AAV 100, as shown in FIG. 6. For example, distance determining element 604-1 may be mounted to the AAV 100 and oriented to emit a laser signal that projects from the front of the AAV 100. The distance determining element 604-2 may be mounted to the AAV 100 and oriented to emit a laser signal that projects down from the AAV 100. The distance determining element 604-3 may be mounted to the AAV 100 and oriented to emit a laser signal that projects above the AAV 100. The distance determining element 604-4 may be mounted to the AAV 100 and oriented to emit a laser signal that projects behind the AAV 100.

While the example illustrated in FIG. 6 includes four distance determining elements mounted to the AAV 100, in other implementations, fewer or additional distance determining elements may be utilized. Likewise, the distance determining elements may be mounted to the AAV, incorporated into the motors 620, as discussed above, or a combination thereof. Likewise, the motors 620 may all be mounted at the same angle with respect to the AAV 100 or one or more of the motors 620 may be offset in the manner discussed above with respect to FIG. 5

Regardless of the configuration of the distance determining elements and/or the position of the motors 620, the detectable area around the AAV can be further increased by manipulating the pitch, yaw and/or roll of the AAV while it is moving. For example, the pitch of the AAV 100 may be periodically altered. By altering the pitch of the AAV 100, the area covered by the distance determining elements projecting in front of and behind the AAV 100 is increased. Likewise, the roll of the AAV 100 may be periodically altered. By altering the roll of the AAV 100, the area covered by the distance determining elements projecting to the right or left of the AAV 100 is increased. By altering the yaw of the AAV 100, the area around the distance determining elements projecting out of the front, rear and sides of the AAV 100 will cover the entire area around the AAV 100. By combining one or more of altering the pitch, roll and/or yaw while the AAV is in motion, the area around the AAV 100 detectable by the distance determining elements is further increased. Likewise, with AAVs such as a quad-copter or an octo-copter, the direction of the AAV may be maintained even though the pitch, yaw and/or roll is altered. For example, an AAV may be moving north and the yaw may be adjusted so that the AAV 100 rotates in a clockwise direction. The rotation can occur without altering the direction of flight. Likewise, the pitch and/or roll can be adjusted without altering the flight path of the AAV 100.

Figure 7:
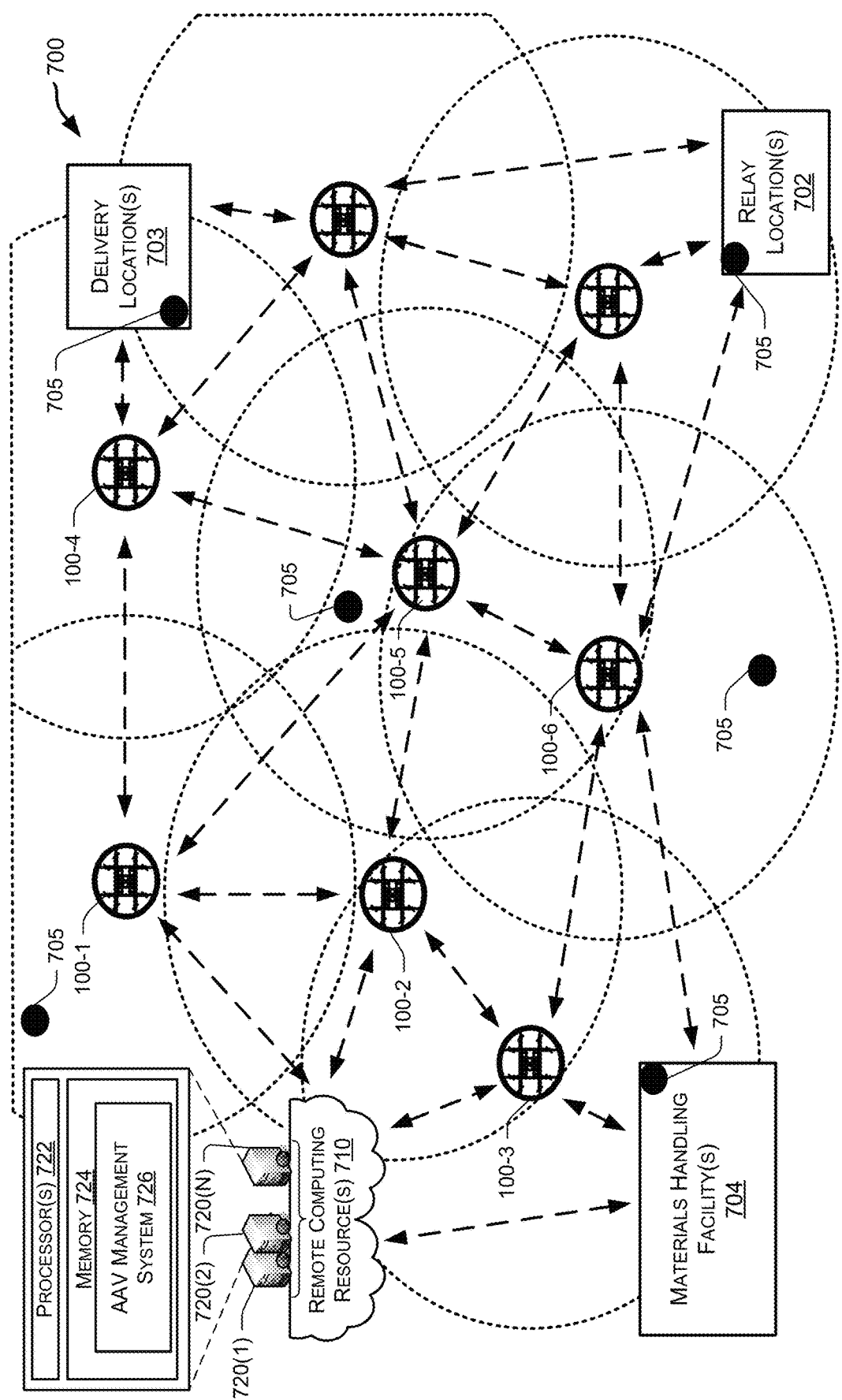
FIG. 7 depicts a diagram of an automated aerial vehicle environment, according to an implementation.

FIG. 7 depicts a block diagram of an AAV network 700 that includes AAVs 100, delivery locations 703, relay locations 702, materials handling facilities 704 and remote computing resources 710, according to an implementation. In addition, one or more fixed position transmitters 705 may be included in the environment that transmit fixed position information (e.g., geographic coordinates). The fixed position transmitters may be included at any known, fixed location. For example, the fixed position transmitters may be included on a materials handling facility(s) 704, relay location(s) 702, delivery location(s) 703, on cellular towers (not shown), on buildings, on landing areas, or at any other known location.

Each of the AAVs 100, delivery locations 703, relay locations 702, materials handling facilities 704 and/or remote computing resources 710 may be configured to communicate with one another. For example, the AAVs 100 may be configured to form a wireless mesh network that utilizes Wi-Fi or another wireless means of communication, each AAV communicating with other AAVs within wireless range. In other implementations, the AAVs 100, AAV management system 726, materials handling facilities 704, relay locations 702 and/or the delivery locations 703 may utilize existing wireless networks (e.g., cellular, Wi-Fi, satellite) to facilitate communication. Likewise, the remote computing resources 710, materials handling facilities 704, delivery locations 703 and/or relay locations 702 may also be included in the wireless mesh network. In some implementations, one or more of the remote computing resources 710, materials handling facilities 704, delivery locations 703 and/or relay locations 702 may also communicate with each other via another network (wired and/or wireless), such as the Internet.

The remote computing resources 710 may form a portion of a network-accessible computing platform implemented as a computing infrastructure of processors, storage, software, data access, and other components that is maintained and accessible via a network, such as the mesh network and/or another wireless or wired network (e.g., the Internet). As illustrated, the remote computing resources 710 may include one or more servers, such as servers 720(1), 720(2), . . . , 720(N). These servers 720(1)-(N) may be arranged in any number of ways, such as server farms, stacks, and the like that are commonly used in data centers. Furthermore, the servers 720(1)-(N) may include one or more processors 722 and memory 724 which may store an AAV management system 726.

The AAV management system 726 may be configured, for example, to communicate with the delivery locations 703, AAVs 100, materials handling facilities 704, and/or relay locations 702. As an example, position information for each AAV 100 may be determined and shared among AAVs. Each AAV may periodically transmit, for example, ADS-B information to other AAVs in the network. When information, such as ADS-B information, is sent to or from an AAV, the information may include an identifier for the AAV and each AAV may act as a node within the network, forwarding the information until it is received by the intended AAV. For example, the AAV management system 726 may send a message to AAV 100-6 by transmitting the information and the identifier of the intended receiving AAV to one or more of AAVs 100-1, 100-2, 100-3, 100-4 that are in wireless communication with the AAV management system 726. Each receiving AAV will process the identifier to determine if it is the intended recipient and then forward the information to one or more other AAVs that are in communication with the AAV. For example, AAV 100-2 may forward the message and the identification of the intended receiving AAV to AAV 100-1, 100-3 and 100-5. In such an example, because AAV 100-3 has already received and forwarded the message, it may discard the message without forwarding it again, thereby reducing load on the mesh network 700. The other AAVs, upon receiving the message, may determine that they are not the intended recipients and forward it on to other nodes. This process may continue until the message reaches the intended recipient.

In some implementations, if an AAV loses communication with other AAVs via the wireless mesh network, it may activate another wireless communication path to regain connection. For example, if an AAV cannot communicate with any other AAVs via the mesh network 700, it may activate a cellular and/or satellite communication path to obtain communication information from the AAV management system 726, materials handling facility 704, relay location 702 and/or a delivery location 703. If the AAV still cannot regain communication and/or if it does not include an alternative communication component, it may automatically and autonomously navigate toward a designated location (e.g., a nearby materials handling facility 704, relay location 702 and/or delivery location 703).

The wireless mesh network 700 may be used to provide communication between AAVs (e.g., to share weather information, location information, routing information, landing areas), AAV management system 726, materials handling facilities 704, delivery locations 703 and/or relay locations 702. Likewise, in some implementations, the wireless mesh network may be used to deliver content and/or other information to other computing resources, such as personal computers, electronic book reading devices, audio players, mobile telephones, tablets, desktops, laptops, etc. For example, the mesh network may be used to deliver electronic book content to electronic book reading devices of customers.

Figure 8:
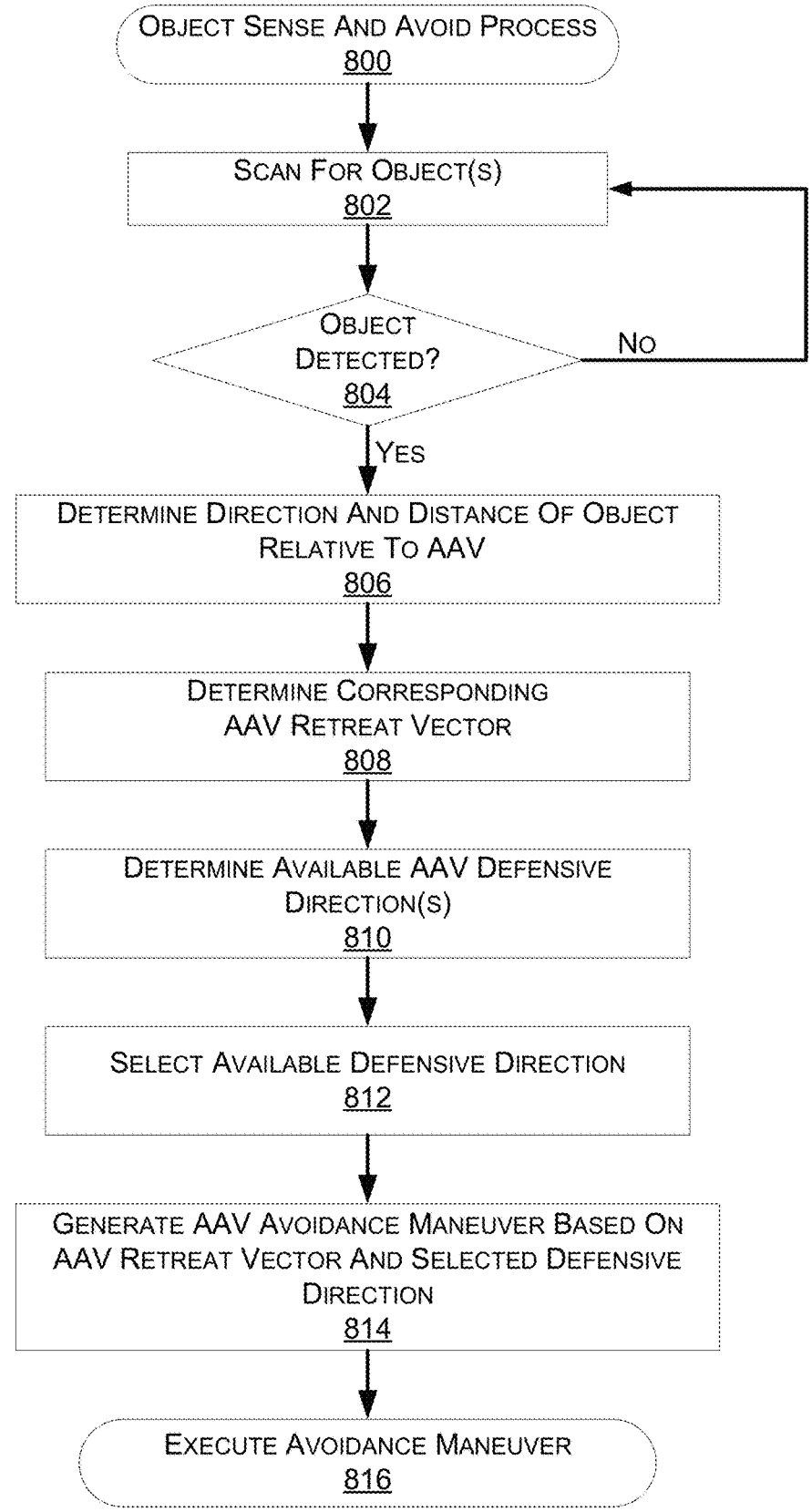
FIG. 8 is a flow diagram illustrating an example object avoidance process, according to an implementation.

FIG. 8 is a flow diagram illustrating an example object avoidance process 800, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

The example process 800 begins by scanning for objects, for example, using one or more of the implementations discussed above, as in 802. In some implementations, multiple modes of detection may be utilized. For example, both distance determining elements and image capture devices (e.g., cameras) may be used together to identify and/or determine the location of objects. Likewise, in some implementations, multiple forms of distance determining elements may be utilized. For example, both a ranging laser signal and sonar may be used to determine a distance between the AAV and an object.

As the AAV is scanning for an object, a determination is made as to whether an object has been detected, as in 804. If it is determined that an object has not been detected, the example process 800 returns to block 802 and continues. However, if an object is detected, a distance of the object from the AAV and an object vector relative to the AAV is determined, as in 806. In this example, the object itself may not need be determined, just its direction and distance with respect to the AAV. Likewise, in some implementations, the precise direction of the object with respect to the AAV may not be determined. For example, a coarse object direction (e.g., up and to the left) with respect to the AAV may be determined and used with the implementations described herein.

The distance ($d_i$) between the object and the AAV and/or a direction of the object with respect to the AAV are detected. The object vector ($v_i$) may represent a direction of the object with respect to the AAV, a magnitude of velocity of the object with respect to the AAV and/or a distance of the object from the AAV. In some implementations, the object vector may be computed in a reference frame of the AAV, with the AAV as the point of reference (stationary) and all other objects being considered with respect to the AAV.

To determine the object vector, in some implementations, multiple samplings of the distance between the object and the AAV may be determined over a period of time. The samples and the period of time may then be used to determine both the direction of the object, the distance of the object and/or the velocity of the object with respect to the AAV. In other implementations, multiple images of the object may be captured over a period of time and the direction of the object, distance of the object and/or velocity of the object with respect to the AAV may be determined based on a change in size of the object between the captured images and based on the position of the AAV when each image is captured.

In some implementations, multiple objects may be detected. When multiple objects are detected, a distance, direction and/or object velocity with respect to the AAV for each detected object may be determined. For example, if two objects are detected, a distance and direction of each object with respect to the AAV may be determined. Likewise, an object vector with respect to the AAV may be determined for each object.

Based on the distance(s) and object vector(s), a corresponding retreat vector for the AAV may be determined, as in 808. In implementations where a single object is detected, the retreat vector may be coincident with the object vector of the detected object. Likewise, the magnitude of the retreat vector may be the same, greater than or less than the magnitude of the velocity of the object vector. In some implementations, the magnitude of the retreat vector may always be greater than the magnitude of the velocity of the object vector, up to a maximum velocity of the AAV. In other implementations, the magnitude of the retreat vector may be dependent on the distance of the object from the AAV. For example, a pushing function f(d) may be established that is used to adjust the magnitude of the retreat vector based on the distance between the object and the AAV. For example, the pushing function f(d)=1/d, where d is the distance between the detected object and the AAV, may be combined with the object vector to determine the retreat vector:

$$RetreatVector = f(d_1) * v_1$$

In implementations where multiple objects are detected, the retreat vector may be determined based on the determined pushing function of each object and/or the object vector representative of each object. For example, the retreat vector may be the sum of the object vector and the pushing function of each detected object:

$$RetreatVector = \Sigma f(d_i) * v_i = f(d_1) * v_1 + f(d_2) * v_2 + \ldots f(d_n) * v_n$$

where n is the number of detected objects.

In some implementations, the pushing function may be scaled and/or fitted to a particular curve (e.g., parabola). For example, values of the pushing function may be scaled such that there is a maximum value of 1 and a minimum value of 0, with the maximum value of 1 being at a minimal distance between the object and the AAV and/or a minimum distance that a sensor of the AAV can detect. Likewise, the minimum value of 0 may represent the maximum distance a sensor can sense or a defined maximum distance from the AAV. For example, a minimum distance of 0.1 meters and a maximum distance of 2.0 meters may be established for an AAV and used with the implementations discussed herein.

In still other implementations, rather than establishing a retreat vector based on a distance based pushing function, in some implementations, the pushing function may be determined based on a computed "time to impact." For example, as discussed above, the velocity, direction and distance of the object with respect to the AAV may be determined. Utilizing this information, a time remaining until the object collides with the AAV may be computed as the "time to impact" (t). In such an implementation, the retreat vector may be determined using the same equation discussed above, but the pushing function may be based on the time to impact rather than a distance between the object and the AAV. For example, the pushing function may be f(t)=1/t, where t is the time to impact between the detected object and the AAV.

Using a time to impact pushing function provides the advantage of allowing the AAV to react more strongly to objects that have a smaller time to impact even if they are a greater distance away than other objects that have a longer time to impact. For example, if two objects are approaching and the first object has a distance of 0.5 meters and a time to impact of 15 seconds and the second object has a distance of 1.0 meter and a time to impact of 8 seconds, the resulting retreat vector that utilizes a time to impact pushing function will have a greater influence from the object with the lower time to impact.

In addition to determining a retreat vector, available defensive directions may also be determined, as in 810. For example, if a single object is detected, available defensive directions may be any direction that is not coincident with the direction of the object vector representative of the detected object. In some implementations, the defensive directions may be those directions that are more than a defined degree different than the direction of the object vector. For example, available defensive directions may be any direction that is greater than 35 degrees different than the direction of the object vector. In still other implementations, available defensive directions may be a predetermined number of defensive directions from the direction of the object vector. For example, available defensive directions may be any direction that is 30 degrees different than the direction of the object vector, 45 degrees different than the direction of the object vector, 90 degrees different than the object vector, or 120 degrees different than the direction of the object vector. Because the AAV can travel in any direction, the number of available defensive directions that are different than the direction of the object vector is essentially infinite when considering a single object to be avoided.

If multiple objects are detected, the available defensive directions may consider the directions of all object vectors and the position of the AAV. For example, in the case of two objects, a plane that includes both object vectors and the AAV may be determined and available defensive directions may be any direction that is not along a surface of the determined plane (i.e., the defensive direction extends in a third dimension that is different than the plane). In other implementations, available defensive directions may be any direction that is not along the plane and is different than the plane by more than a defined degree. For example, available defensive directions may be any direction that is greater than 35 degrees in a third direction from the plane. In still other implementations, available defensive directions may be a predetermined number of defensive directions from the surface of the plane. For example, available defensive directions may be any direction that is 30 degrees in a third direction from the surface of the plane, 45 degrees in a third direction from the surface of the plane, 90 degrees in a third direction from the surface of the plane, or 120 degrees in a third direction from the surface of the plane.

In still another implementation, available defensive directions with respect to the object vector of the first object may be determined and available defensive directions with respect to the second object vector may be determined. The two sets of available defensive directions may then be combined or compared and available defensive directions that exist in both sets of available defensive directions may be identified as available defensive directions from which the AAV may select a defensive direction. Identifying defensive directions that are available for each object may be beneficial when more than two objects are detected. For example, if three objects are detected and they do not all lie along the same plane, the available defensive directions for each object may be determined and defensive directions that are available with respect to each object may be utilized for selecting a defensive direction.

Returning to FIG. 8, the AAV selects a defensive direction from the set of determined available defensive directions, as in 812. In some implementations, the defensive direction may be randomly or pseudo-randomly selected. By randomly or pseudo-randomly selecting a defensive direction, the resulting avoidance maneuver will vary between occurrences so that a potentially malicious object cannot develop a pattern of movement of the AAV. For example, if the object is a bird that is attempting to attack the AAV, by varying the defensive direction and thereby the resulting avoidance maneuvers, the bird is not able to discern a pattern of movement of the AAV.

Based on the retreat vector and the selected defensive direction, an avoidance maneuver is generated, as in 814. In some implementations, generation of the avoidance maneuver may include determining a defensive vector that represents the selected defensive direction and a magnitude in the defensive direction. The retreat vector and the defensive vector may then be summed to generate an avoidance vector that may be utilized as the avoidance maneuver. In other implementations, the example process 800 may only consider the retreat vector and the determined defensive direction to generate an avoidance maneuver, and/or generate a defensive vector with a magnitude of unity. The avoidance maneuver may utilize the magnitude determined for the retreat vector and a direction resulting from a combination of the retreat vector direction and the selected defensive direction. In other implementations, the avoidance maneuver may utilize the magnitude determined for the retreat vector and a direction determined for the defensive direction.

In some implementations, the example process may determine a time at which the avoidance maneuver is to be performed or a distance between the AAV and the object(s) that will cause the avoidance maneuver to be performed. For example, a minimum distance between the object and the AAV necessary to perform the maneuver and avoid the object may be determined based on the velocity of the object, the time to impact, and/or the maneuverability of the AAV. When the object reaches the minimum distance, the AAV may execute the avoidance maneuver. Waiting to initiate the avoidance maneuver reduces an ability for the approaching object to adjust course and still contact the AAV. For example, if the approaching object is a bird and the avoidance maneuver is performed when the object is first detected, the object may have time to change course, thereby altering the direction and/or magnitude of the object vector, and still contact the AAV. By waiting until the object has gotten closer to the AAV before executing the avoidance maneuver, the object (bird) has less time to react to the avoidance maneuver.

Finally, after determining the avoidance maneuver and optionally an execution time/distance, the example process 800 provides instructions to execute the avoidance maneuver, as in 816.

In some implementations, in addition to determining and executing an avoidance maneuver, the example process may provide avoidance information to the AAV management system and/or other AAVs. Avoidance information may include, for example, the location of the AAV, the avoidance maneuver, the defensive direction selected, etc. As discussed below, avoidance information may be maintained and preferred defensive directions developed for different locations and/or different object types.

Figure 9:
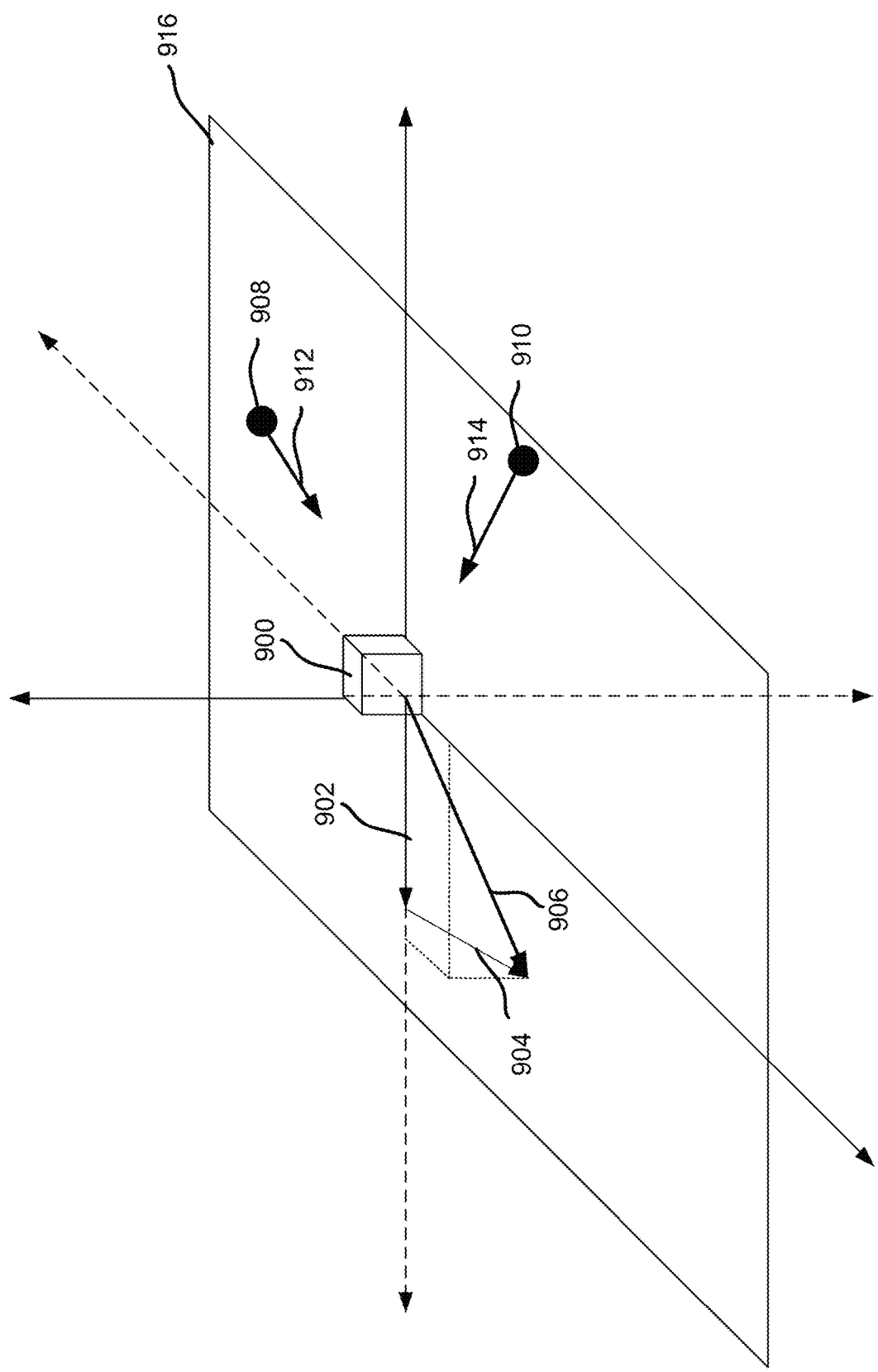
FIG. 9 depicts a block diagram for determining a retreat vector and a defensive direction, and generating an avoidance maneuver, according to an implementation.

FIG. 9 depicts a block diagram for determining a retreat vector 902, a defensive direction 904 and a resulting avoidance vector 906, according to an implementation. In the example illustrated in FIG. 9, there are two objects 908, 910 detected as approaching an AAV, represented as a cube 900. For each detected object 908, 910, an object vector 912, 914 that represents both the direction and distance of the object with respect to the AAV is determined. Because there are only two objects in this example, a plane 916 having a surface along which both objects 908, 910 and the AAV lie may be determined. By determining a plane, the directions of the objects with respect to the AAV can be considered in two dimensions and a defensive direction may be available in a third dimension. For example, if the surface of the plane 916 is defined to lie along two dimensions (x, y), the defensive direction 904 may extend in a third dimension (z) that does not lie along the surface of the plane.

In this example, the sum of the two object vectors 912, 914 is determined and a retreat vector 902 is generated that is coincident with the sum of the two object vectors 912, 914 and factors in a pushing function determined for each of the two objects. The defensive direction 904 is randomly selected to extend down (with respect to the surface of the plane) in a third direction at approximately 50 degrees and to the left (with respect to the direction of the retreat vector) at approximately 30 degrees. Based on the determined retreat vector 902 and the selected defensive direction 904, a resulting avoidance vector 906 may be determined that is utilized for the avoidance maneuver. In this example, the avoidance vector 906 is the sum of the retreat vector 902 and a defensive vector having the selected defensive direction and a magnitude of unity.

Figure 10:
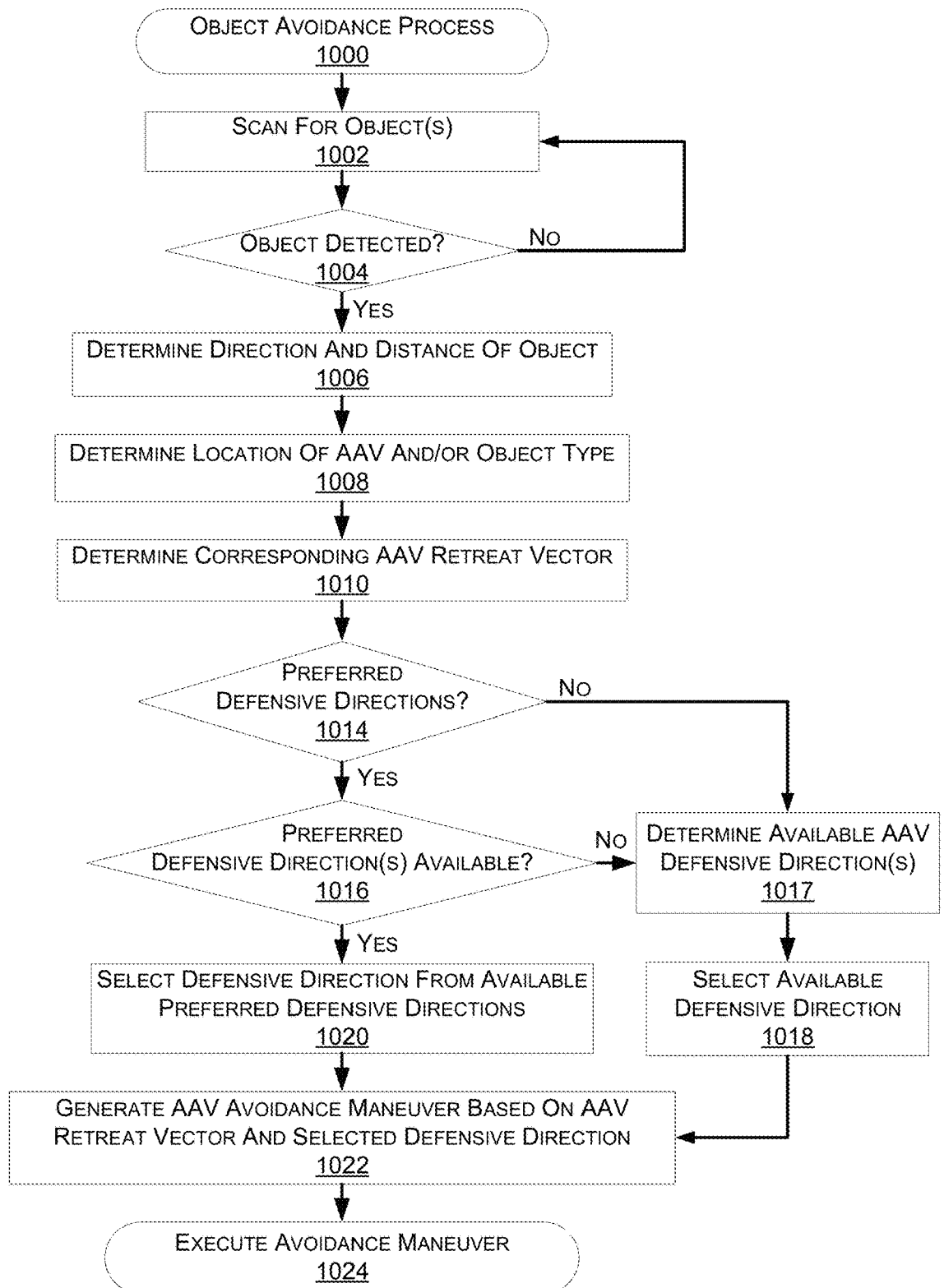
FIG. 10 is a flow diagram illustrating another example object avoidance process, according to an implementation.

FIG. 10 is a flow diagram illustrating another example object avoidance process 1000, according to an implementation. The example process 1000 begins by scanning for objects, for example, using one or more of the implementations discussed above, as in 1002. In some implementations, multiple modes of detection may be utilized. For example, both distance determining elements and image capture devices (e.g., cameras) may be used together to identify and/or determine the location of objects. Likewise, in some implementations, multiple forms of distance determining elements may be utilized. For example, both a ranging laser signal and sonar may be used to determine a distance between the AAV and an object.

As the AAV is scanning for an object, a determination is made as to whether an object has been detected, as in 1004. If it is determined that an object has not been detected, the example process 1000 returns to block 1002 and continues. However, if an object is detected, a distance of the object with respect to the AAV, a direction of the object with respect to the AAV and/or an object vector are determined, as in 1006. In this implementation, the absolute position of the AAV may be known, for example based on GPS data, and the corresponding direction and distance of each detected object may be determined with respect to the absolute position of the AAV. The object vector may represent both a direction of the object and a distance of the object with respect to the AAV.

To determine the object vector, in some implementations, multiple samplings of the distance between the object and the AAV may be determined over a period of time. The samples and the period of time may then be used to determine both the direction and the distance of the object with respect to the AAV.

In some implementations, multiple objects may be detected. When multiple objects are detected, a direction and distance for each detected object with respect to the AAV may be determined. Likewise, an object vector representative of the distance and direction of each object with respect to the AAV may be determined for each object.

In addition to determining the position of the object and the object vector, the location of the AAV and/or the object type may be determined, as in 1008. For example, if the AAV utilizes GPS for navigation, a location of the AAV may be based on the current GPS data. The object type for an object may be determined based on, for example, additional analysis of the object. For example, one or more images of the object may be captured and processed in an effort to identify the object. For example, one or more pattern matching algorithms, object detection algorithms and/or shape detection algorithms may be performed in an effort to determine the object type.

Processing of images of the object may be done using one or more processors local to the AAV and/or using one or more remote computing systems. In some implementations, an initial processing of captured images may be performed locally on the AAV in an effort to make an initial object type determination. For example, captured images may be processed to determine a shape of the object and the determined shape may be compared to known object shapes (e.g., birds, AAVs) in an effort to determine the object type. If the object type cannot be determined locally, the images may be provided to the AAV management system for further processing and object identification.

Returning to FIG. 10, based on the distance(s) and object vector(s) of each detected object, a corresponding retreat vector for the AAV may be determined, as in 1010. In implementations where a single object is detected, the retreat vector may be coincident with the object vector of the detected object. Likewise, the magnitude of the retreat vector may be the same, greater than or less than the magnitude of the velocity of the object. In some implementations, the magnitude of the retreat vector may always be greater than the magnitude of the velocity of the object, up to a maximum velocity of the AAV. In other implementations, the retreat vector may factor in a pushing function, based on distance between the object and the AAV or time to impact, as discussed above. In implementations where multiple objects are detected, the retreat vector is determined based on the direction of each object, the object vector representative of each object and/or the determined pushing function for each detected object. Continuing with the example of two objects being detected, the retreat vector may be the sum of the object vector and the pushing function for each object.

The magnitude and/or direction of the retreat vector may also be adjusted based on the location of the AAV and/or based on the determined object type. For example, if the object type is determined to be a bird, a maximum possible velocity of the bird may be determined and the magnitude of the retreat vector may be increased to exceed the maximum possible velocity of the object. As another example, if the AAV is determined to be in a location that is frequented by a particular object type, the direction and/or magnitude of the retreat vector may be adjusted based on the potential for that object type being the detected object.

A determination is also made as to whether one or more preferred defensive directions are associated with the location and/or the object type, as in 1014. In some implementations, an object and/or location may have preferred defensive directions that, if available, are to be used for selecting a defensive direction. Preferred defensive directions for a particular location may be determined based on feedback from other AAVs that have navigated through the location and/or encountered the same type of object and performed avoidance maneuvers. Based on the collected information, it may be determined which defensive directions are more successful in the particular location than others and those may be established as preferred defensive directions.

As an example, if the object type is a bird, it may be determined from past encounters with birds by other AAVs that defensive directions that are in the downward direction and/or to the right from the direction of travel of the bird are more successful than defensive directions that are upward and/or to the left from the direction of travel of the bird. In such an example, the defensive directions that are downward and/or to the right from the direction of travel of the bird may be considered preferred defensive directions. In a similar manner, if the AAV is in a location in which other AAVs have historically had to perform avoidance maneuvers to avoid objects, based on those past experiences, it may be determined which defensive directions result in successful avoidance maneuvers and those defensive directions may be identified as preferred defensive directions.

If it is determined that preferred defensive directions exist for the object and/or location of the AAV, a determination is made as to whether one or more preferred defensive directions are available, as in 1016. For example, if the preferred defensive direction is down and/or to the left from the direction of the detected object but there are multiple objects, it may be determined that there is no available defensive direction that is in the preferred defensive direction. If it is determined that there is no preferred defensive direction available, or if it is determined at decision block 1014 that there are no preferred defensive directions, an available defensive direction is determined, as in 1017 (discussed below).

However, if it is determined that there are preferred defensive directions available, a defensive direction is selected from the set of preferred defensive directions that are available, as in 1020. Similar to selecting a defensive direction, a preferred defensive direction may be randomly or pseudo-randomly selected from the set of preferred defensive directions that are available.

By randomly or pseudo-randomly selecting a defensive direction, the resulting avoidance maneuver will vary between occurrences so that a potentially malicious object cannot determine a pattern of movement of the AAV. For example, if the object is a bird that is attempting to attack the AAV, by varying the defensive direction and thereby the resulting avoidance maneuvers, the bird is not able to discern a pattern of movement of the AAV.

If it is determined at decision block 1014 that there are no preferred defensive directions associated with the location and/or the object and/or if it is determined at decision block 1016 that there are no preferred defensive directions available, available defensive directions are determined, as in 1017. For example, if a single object is detected, available defensive directions may be any direction that is not coincident with the direction of the object vector representative of the detected object. In some implementations, the defensive directions may be those directions that are more than a defined degree different than the direction of the object vector. For example, available defensive directions may be any direction that is greater than 35 degrees different than the direction of the object vector. In still other implementations, available defensive directions may be a predetermined number of defensive directions from the direction of the object vector. For example, available defensive directions may be any direction that is 30 degrees different than the direction of the object vector, 45 degrees different than the direction of the object vector, 90 degrees different than the direction of the object vector, or 120 degrees different than the direction of the object vector. Because the AAV can travel in any direction, the number of available defensive directions that are different than the direction of the object vector is essentially infinite when considering a single object to be avoided.

If multiple objects are detected, the available defensive directions may consider the directions of all object vectors and the position of the AAV. For example, in the case of two objects, a plane that includes both object vectors and the AAV may be determined and available defensive directions may be any direction that is not along the determined plane (i.e., the defensive direction extends in a third dimension that is different than the plane). In other implementations, available defensive directions may be any direction that is not along the plane and is different than the plane by more than a defined degree. For example, available defensive directions may be any direction that is greater than 35 degrees in a third direction from the plane. In still other implementations, available defensive directions may be a predetermined number of defensive directions from the surface of the plane. For example, available defensive directions may be any direction that is 30 degrees in a third direction from the surface of the plane, 45 degrees in a third direction from the surface of the plane, 90 degrees in a third direction from the surface of the plane, or 120 degrees in a third direction from the surface of the plane.

In still another implementation, available defensive directions with respect to the object vector of the first object may be determined and available defensive directions with respect to the second object vector may be determined. The two sets of available defensive directions may then be combined or compared and available defensive directions that exist in both sets of available defensive directions may be identified as available defensive directions from which the AAV may select a defensive direction. Identifying defensive directions that are available for each object may be beneficial when more than two objects are detected. For example, if three objects are detected and they do not all lie along the same plane, the available defensive directions for each object may be determined and defensive directions that are available with respect to each object may be utilized for selecting a defensive direction.

From the available AAV defensive directions, a defensive direction is selected, as in 1018. In some implementations, the AAV defensive direction may be randomly or pseudo-randomly selected. By randomly or pseudo-randomly selecting a defensive direction, the resulting avoidance maneuver will vary between occurrences so that a potentially malicious object cannot determine a pattern of movement of the AAV. For example, if the object is a bird that is attempting to attack the AAV, by varying the defensive direction and thereby the resulting avoidance maneuvers, the bird is not able to discern a pattern of movement of the AAV.

Based on the retreat vector and the selected defensive direction (either an available preferred defensive direction or an available defensive direction), an avoidance maneuver is generated, as in 1022. In some implementations, generation of the avoidance maneuver may include determining a defensive vector that represents the selected defensive direction and a magnitude in the defensive direction. The retreat vector and the defensive vector may then be summed to generate an avoidance vector that may be utilized as the avoidance maneuver. In other implementations, the example process 1000 may only consider the retreat vector and the determined defensive direction to generate an avoidance maneuver and/or generate a defensive vector with a magnitude of unity. The avoidance maneuver may utilize the magnitude determined for the retreat vector and a direction resulting from a combination of the retreat vector direction and the selected defensive direction.

In some implementations, the example process may determine a time at which the avoidance maneuver is to be performed or a distance between the AAV and the object(s) that will cause the avoidance maneuver to be performed. For example, a minimum distance between the object and the AAV necessary to perform the maneuver and avoid the object may be determined based on the velocity of the object and the maneuverability of the AAV. When the object reaches the minimum distance, the AAV may execute the avoidance maneuver. Waiting to initiate the avoidance maneuver reduces an ability for the approaching object to adjust course and still contact the AAV. For example, if the approaching object is a bird and the avoidance maneuver is performed when the bird is first detected, the bird may have time to change course, thereby altering the direction and/or magnitude of the object vector, and still contact the AAV. By waiting until the bird has gotten closer to the AAV before executing the avoidance maneuver, the object (bird) has less time to react to the avoidance maneuver.

Finally, after determining the avoidance maneuver and optionally an execution time/distance, the example process 1000 provides instructions to execute the avoidance maneuver, as in 1024.

In some implementations, in addition to determining and executing an avoidance maneuver, the example process may provide avoidance information to the AAV management system and/or to other AAVs. Avoidance information may include, for example, the location of the AAV, the avoidance maneuver, the defensive direction selected, the determined object type, etc.

Figure 11:
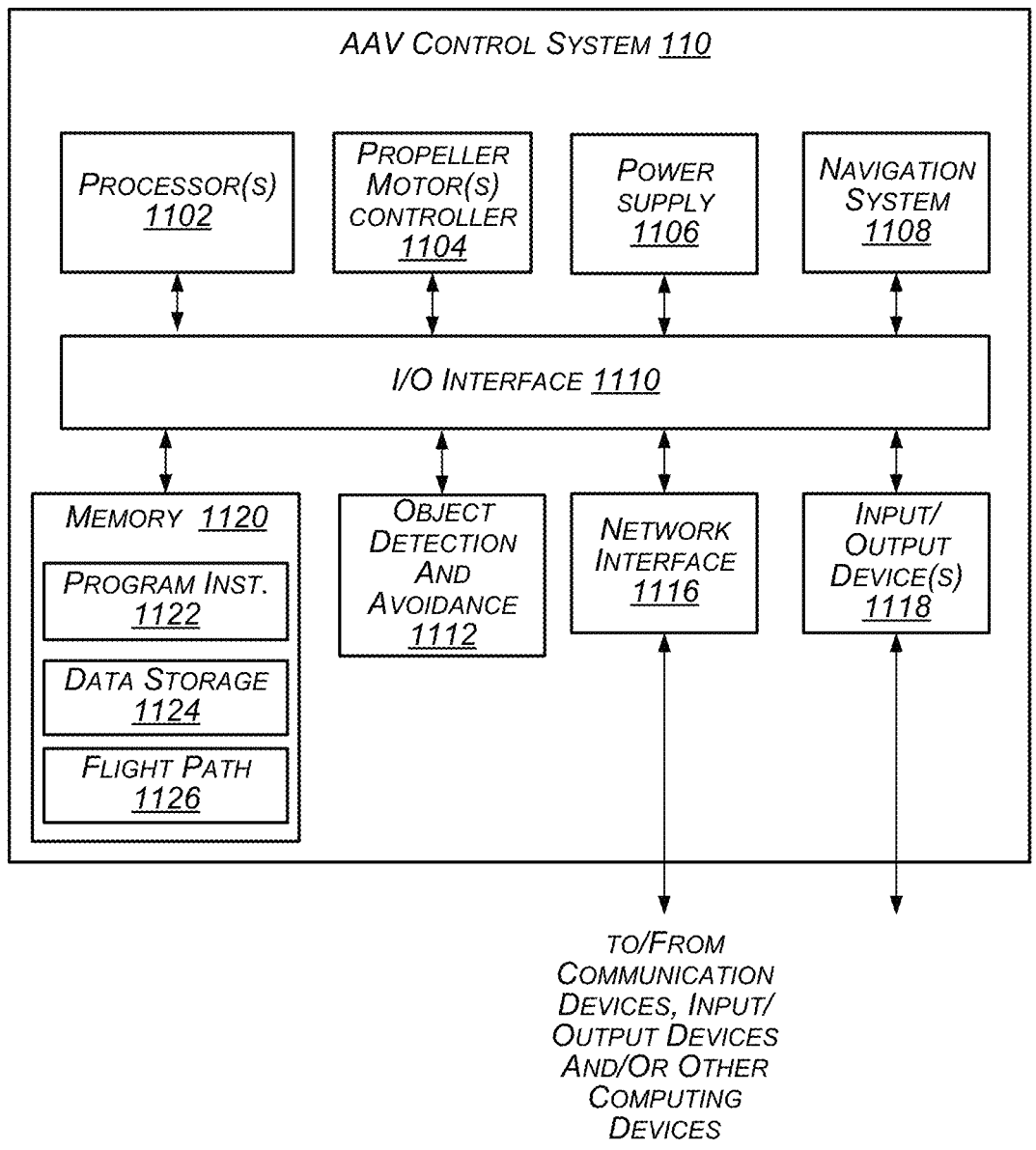
FIG. 11 is a block diagram illustrating various components of an automated aerial vehicle control system, according to an implementation.

FIG. 11 is a block diagram illustrating an example AAV control system 110 of the AAV 100. In various examples, the block diagram may be illustrative of one or more aspects of the AAV control system 110 that may be used to implement the various systems and methods discussed above. In the illustrated implementation, the AAV control system 110 includes one or more processors 1102, coupled to a non-transitory computer readable storage medium 1120 via an input/output (I/O) interface 1110. The AAV control system 110 may also include a propeller motor controller 1104, power supply module 1106 and/or a navigation system 1108. The AAV control system 110 further includes an object detection and avoidance controller 1112, a network interface 1116, and one or more input/output devices 1118.

In various implementations, the AAV control system 110 may be a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable storage medium 1120 may be configured to store executable instructions, data, flight paths and/or data items accessible by the processor(s) 1102. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1120 as program instructions 1122, data storage 1124 and flight path data 1126, respectively. In other implementations, program instructions, data and/or flight paths may be received, sent or stored upon different types of computer-accessible media, such as non-transitory media, or on similar media separate from the non-transitory computer readable storage medium 1120 or the AAV control system 110. Flight path data may include, for example, avoidance maneuvers, defensive directions, avoidance information, etc.

Generally speaking, a non-transitory, computer readable storage medium may include storage media or memory media such as magnetic or optical media, e.g., disk or CD/DVD-ROM, coupled to the AAV control system 110 via the I/O interface 1110. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1116.

In one implementation, the I/O interface 1110 may be configured to coordinate I/O traffic between the processor(s) 1102, the non-transitory computer readable storage medium 1120, and any peripheral devices, the network interface or other peripheral interfaces, such as input/output devices 1118. In some implementations, the I/O interface 1110 may perform any necessary protocol, timing or other data transformations to convert data signals from one component (e.g., non-transitory computer readable storage medium 1120) into a format suitable for use by another component (e.g., processor(s) 1102). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable storage medium 1120, may be incorporated directly into the processor(s) 1102.

The propeller motor(s) controller 1104 communicates with the navigation system 1108 and adjusts the power of each propeller motor to guide the AAV along a determined flight path and/or to perform avoidance maneuvers. The navigation system 1108 may include a GPS or other similar system than can be used to navigate the AAV to and/or from a location. The object detection and avoidance controller 1112 communicates with the distance determining elements, discussed above, and processes information received from the distance determining elements. For example, information received from the distance determining elements may be processed to detect a presence of an object, determine a position of the object with respect to the AAV, determine object vectors representative of a direction and magnitude of velocity of the object, etc.

The network interface 1116 may be configured to allow data to be exchanged between the AAV control system 110, other devices attached to a network, such as other computer systems, and/or with AAV control systems of other AAVs. For example, the network interface 1116 may enable wireless communication between numerous AAVs. In various implementations, the network interface 1116 may support communication via wireless general data networks, such as a Wi-Fi network. For example, the network interface 1116 may support communication via telecommunications networks such as cellular communication networks, satellite networks, and the like.

Input/output devices 1118 may, in some implementations, include one or more displays, image capture devices, thermal sensors, infrared sensors, time of flight sensors, accelerometers, pressure sensors, weather sensors, etc. Multiple input/output devices 1118 may be present and controlled by the AAV control system 110. One or more of these sensors may be utilized to assist in the landing as well as avoid obstacles during flight.

As shown in FIG. 11, the memory may include program instructions 1122 which may be configured to implement the example processes and/or sub-processes described above. The data storage 1124 may include various data stores for maintaining data items that may be provided for determining flight paths, identifying objects, generating avoidance maneuvers, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AAV control system 110 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AAV control system 110 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AAV control system 110. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from AAV control system 110 may be transmitted to AAV control system 110 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other AAV control system configurations.

Figure 12:
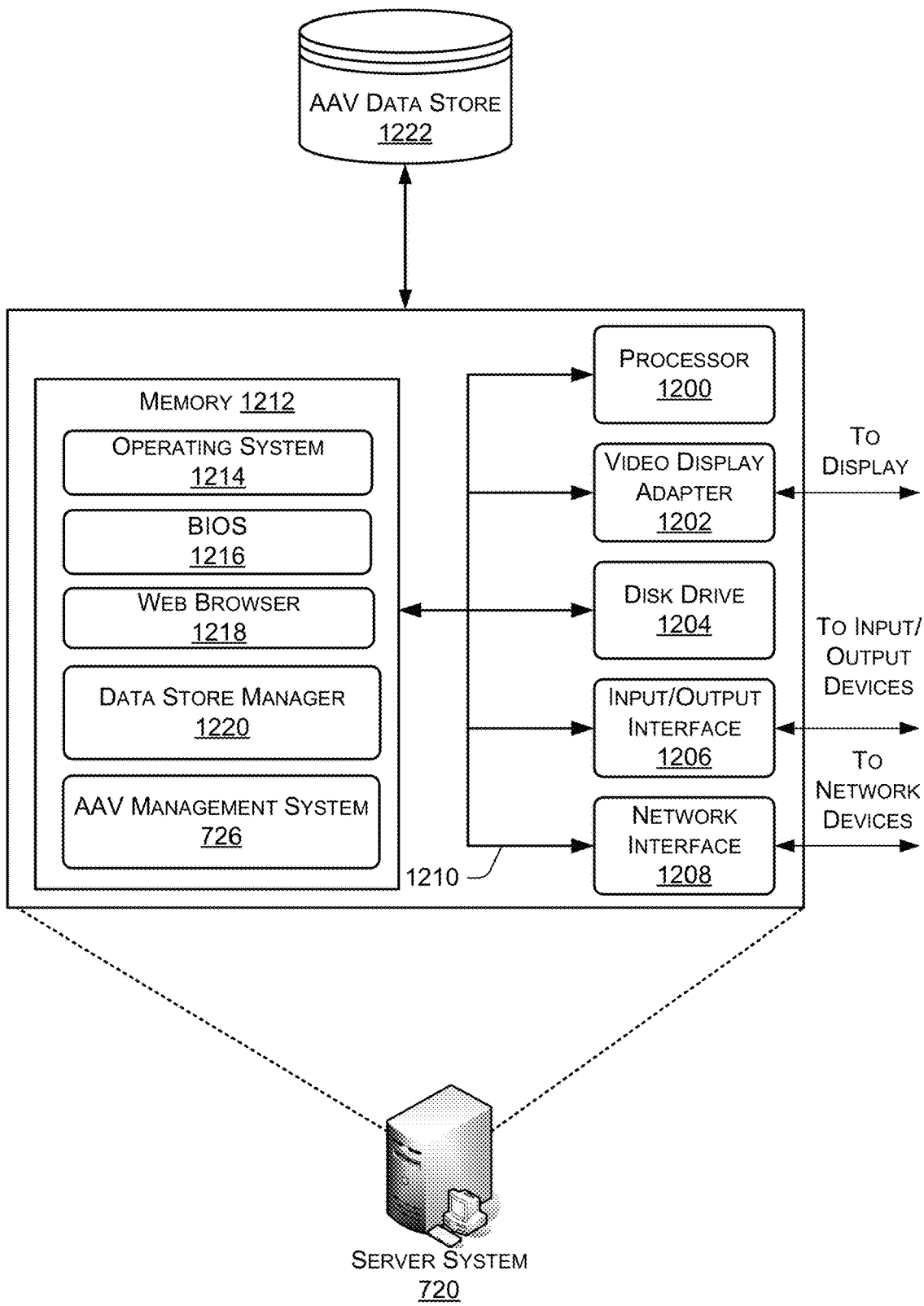
FIG. 12 is a block diagram of an illustrative implementation of a server system that may be used with various implementations.

FIG. 12 is a pictorial diagram of an illustrative implementation of a server system, such as the server system 720, that may be used in the implementations described herein. The server system 720 may include a processor 1200, such as one or more redundant processors, a video display adapter 1202, a disk drive 1204, an input/output interface 1206, a network interface 1208, and a memory 1212. The processor 1200, the video display adapter 1202, the disk drive 1204, the input/output interface 1206, the network interface 1208, and the memory 1212 may be communicatively coupled to each other by a communication bus 1210.

The video display adapter 1202 provides display signals to a local display (not shown in FIG. 12) permitting an operator of the server system 720 to monitor and configure operation of the server system 720. The input/output interface 1206 likewise communicates with external input/output devices not shown in FIG. 12, such as a mouse, keyboard, scanner, or other input and output devices that can be operated by an operator of the server system 720. The network interface 1208 includes hardware, software, or any combination thereof, to communicate with other computing devices. For example, the network interface 1208 may be configured to provide communications between the server system 720 and other computing devices, such as an AAV, materials handling facility, relay location and/or a delivery location, as shown in FIG. 7.

The memory 1212 generally comprises random access memory (RAM), read-only memory (ROM), flash memory, and/or other volatile or permanent memory. The memory 1212 is shown storing an operating system 1214 for controlling the operation of the server system 720. A binary input/output system (BIOS) 1216 for controlling the low-level operation of the server system 720 is also stored in the memory 1212.

The memory 1212 additionally stores program code and data for providing network services to the AAV management system 726. Accordingly, the memory 1212 may store a browser application 1218. The browser application 1218 comprises computer executable instructions that, when executed by the processor 1200, generate or otherwise obtain configurable markup documents such as Web pages. The browser application 1218 communicates with a data store manager application 1220 to facilitate data exchange between the AAV data store 1222 and/or other data stores.

As used herein, the term "data store" refers to any device or combination of devices capable of storing, accessing and retrieving data, which may include any combination and number of data servers, databases, data storage devices and data storage media, in any standard, distributed or clustered environment. The server system 720 can include any appropriate hardware and software for integrating with the AAV data store 1222 as needed to execute aspects of one or more applications for the AAV management system, AAVs, materials handling facilities, delivery locations, and/or relay locations.

The data store 1222 can include several separate data tables, databases or other data storage mechanisms and media for storing data relating to a particular aspect. For example, the data store 1222 illustrated includes AAV information, weather information, flight path information, source location information, destination location information, avoidance information, etc., which can be used to generate and deliver information to the AAV management system 726, materials handling facilities, delivery locations, AAVs, relay locations, and/or users.

It should be understood that there can be many other aspects that may be stored in the AAV data store 1222. The data stores 1222 are operable, through logic associated therewith, to receive instructions from the server system 720 and obtain, update or otherwise process data in response thereto.

The memory 1212 may also include the AAV management system 726, discussed above. The AAV management system 726 may be executable by the processor 1200 to implement one or more of the functions of the server system 720. In one implementation, the AAV management system 726 may represent instructions embodied in one or more software programs stored in the memory 1212. In another implementation, the AAV management system 726 can represent hardware, software instructions, or a combination thereof.

The server system 720, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction in FIG. 12 should be taken as being illustrative in nature and not limiting to the scope of the disclosure.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer implemented method to alter a path of an automated aerial vehicle, comprising:
    detecting a presence of an object;
    determining an object vector representative of a distance and a direction of the object relative to the automated aerial vehicle;
    determining a pushing function representative of the distance between the detected object and the automated aerial vehicle;
    determining, based at least in part on the object vector and the pushing function, a retreat vector;
    determining, based at least in part in on the object vector, a plurality of available defensive directions, wherein each of the plurality of available defensive directions corresponds to a direction that is different than the direction of the object vector;
    randomly selecting an available defensive direction from the plurality of available defensive directions;
    generating an avoidance vector based at least in part on the retreat vector and the randomly selected defensive direction, wherein the avoidance vector is a sum of the retreat vector and the randomly selected defensive direction; and
    executing the avoidance vector to avoid the object.

2. The computer implemented method of claim 1, wherein generating the avoidance vector is based at least in part on a magnitude of the retreat vector and the randomly selected defensive direction.

3. The computer implemented method of claim 1, wherein the pushing function is based at least in part on an inverse of the distance between the object and the automated aerial vehicle.

4. The computer implemented method of claim 1, wherein:
    the object vector and the retreat vector are in a first plane;
    the defensive direction is substantially perpendicular to the first plane; and
    the avoidance vector is not in the first plane.

5. The computer implemented method of claim 1, wherein the defensive direction is selected based at least in part on an object type or a location of the automated aerial vehicle.

6. An automated aerial vehicle comprising:
    a body;
    a plurality of motors;
    an object detection element configured to detect a presence of an object within a defined distance of the body;
    a memory coupled to one or more processors and storing program instructions that when executed by the one or more processors cause the one or more processors to at least:
        determine an object vector representative of a detected object;
        determine, based at least in part on the object vector, a retreat vector representative of a first direction and a first magnitude for navigating the automated aerial vehicle to avoid the detected object;
        determine, based at least in part on the object vector, a defensive direction representative of a second direction for navigating the automated aerial vehicle to avoid the detected object;
        generate an avoidance vector based at least in part on the retreat vector and the defensive direction, wherein the avoidance vector is a sum of the retreat vector and the defensive direction; and
        provide instructions to navigate the automated aerial vehicle according to the avoidance vector.

7. The automated aerial vehicle of claim 6, wherein the object vector representative of the detected object includes a direction of the detected object relative to the automated aerial vehicle and a distance of the detected object relative to the automated aerial vehicle.

8. The automated aerial vehicle of claim 6, wherein:
    the object vector is in the first direction, and
    the defensive direction is in the second direction that intersects the first direction.

9. The automated aerial vehicle of claim 8, wherein the avoidance vector is in a third direction that intersects each of the first direction and the second direction.

10. The automated aerial vehicle of claim 6, wherein the defensive direction is randomly selected from a plurality of directions that are different than a direction of the detected object.

11. The automated aerial vehicle of claim 6, wherein:
    the object detection element is further configured to detect a presence of a second object within the defined distance of the body; and
    the avoidance vector is further generated based at least in part on a time to impact between the second detected object and the automated aerial vehicle.

12. The automated aerial vehicle of claim 11, wherein the avoidance vector is further generated based at least in part on a sum of the object vector representative of a distance and a direction of the detected object relative to the automated aerial vehicle and a second object vector representative of a second distance and a second direction of the second detected object relative to the automated aerial vehicle.

13. The automated aerial vehicle of claim 12, wherein the avoidance vector is further generated based at least in part on a first pushing function determined for the detected object and a second pushing function determined for the second detected object.

14. The automated aerial vehicle of claim 13, wherein the first pushing function is based at least in part on the distance between the detected object and the automated aerial vehicle or a time to impact between the detected object and the automated aerial vehicle, and the second pushing function is based at least in part on the second distance between the second detected object and the automated aerial vehicle or a time to impact between the second detected object and the automated aerial vehicle.

15. The automated aerial vehicle of claim 12, wherein the object vector and the second object vector lie in a first plane with respect to the automated aerial vehicle and the defensive direction lies in a second plane that is different than the first plane.

16. The automated aerial vehicle of claim 6, wherein the instructions when executed by the one or more processors further cause the one or more processors to at least:
transmit, via a communication element of the automated aerial vehicle, at least one of a location of the automated aerial vehicle when the object is detected, a location of the detected object, an object type of the detected object, the object vector of the detected object, the defensive direction, or the avoidance vector.

17. A computer implemented method to avoid an object by an automated aerial vehicle, comprising:
determining an object vector of a detected object;
determining, based at least in part on the object vector, a retreat vector including a first direction to avoid the detected object;
determining, based at least in part on the object vector, a defensive direction including a second direction to avoid the detected object;
generating an avoidance vector including a third direction based at least in part on the retreat vector and the defensive direction, wherein the avoidance vector is a sum of the retreat vector and the defensive direction; and
executing the avoidance vector to avoid the detected object.

18. The computer implemented method of claim 17, wherein:
the second direction of the defensive direction intersects the first direction of the retreat vector; and
the third direction of the avoidance vector intersects each of the first direction and the second direction.

19. The computer implemented method of claim 17, wherein the defensive direction is selected from a plurality of directions that are different than the first direction; and
wherein the plurality of directions are determined based at least in part on at least one of a direction of movement of the detected object, an object type of the detected object, or a location of the automated aerial vehicle.

20. The computer implemented method of claim 17, wherein a magnitude of the avoidance vector is greater than a magnitude of a velocity of the detected object relative to the automated aerial vehicle.

* * * * *